(12) United States Patent
Maor

(10) Patent No.: US 10,572,404 B2
(45) Date of Patent: Feb. 25, 2020

(54) CYCLIC BUFFER POINTER FIXING

(71) Applicant: Intel Corporation, Santa Clara, CA (US)

(72) Inventor: Moshe Maor, Haifa (IL)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 15/638,429

(22) Filed: Jun. 30, 2017

(65) Prior Publication Data

US 2019/0004980 A1    Jan. 3, 2019

(51) Int. Cl.
*G06F 12/00* (2006.01)
*G06F 13/16* (2006.01)
*G06F 9/355* (2018.01)
*G06F 13/28* (2006.01)

(52) U.S. Cl.
CPC ........ *G06F 13/1673* (2013.01); *G06F 9/3552* (2013.01); *G06F 13/28* (2013.01)

(58) Field of Classification Search
CPC ..... G06F 13/1673; G06F 13/28; G06F 9/3552
See application file for complete search history.

(56) References Cited

U.S. PATENT DOCUMENTS

| | | | |
|---|---|---|---|
| 5,659,698 A * | 8/1997 | Weng ........................ | G06F 5/10 711/217 |
| 6,941,441 B2 | 9/2005 | Maor | |
| 2006/0075203 A1* | 4/2006 | Dutta ...................... | G06F 5/065 711/173 |
| 2006/0075208 A1* | 4/2006 | Jones .................... | G06F 9/3001 711/217 |

* cited by examiner

*Primary Examiner* — Kalpit Parikh
(74) *Attorney, Agent, or Firm* — Alliance IP, LLC

(57) ABSTRACT

A processor device is provided with hardware-implemented logic to receive an instruction including a pointer identifier and a pointer change value, the pointer identifier including a pointer address field encoded with an address of a line of memory corresponding to a location of a pointer of a particular one of the one or more cyclic buffers, one or more cushion bits, and a buffer identifier field encoded with a buffer identifier assigned to the particular cyclic buffer. The logic further enables the processor to identify that the instruction is to apply to the particular cyclic buffer based on the buffer identifier, determine that the pointer change value causes a wraparound of the pointer in the particular cyclic buffer, and fix location of the pointer in the particular cyclic buffer based on the wraparound.

20 Claims, 18 Drawing Sheets

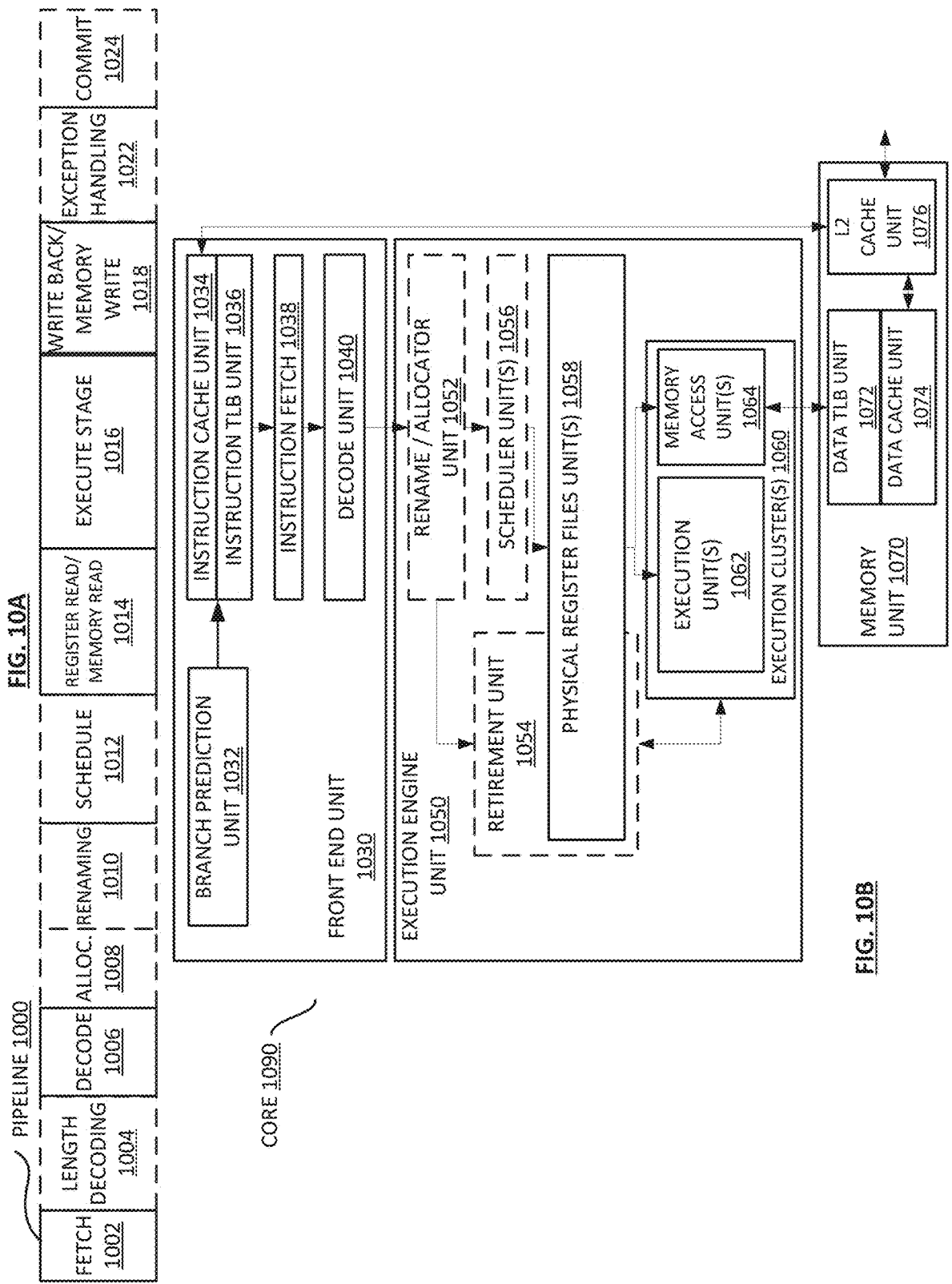

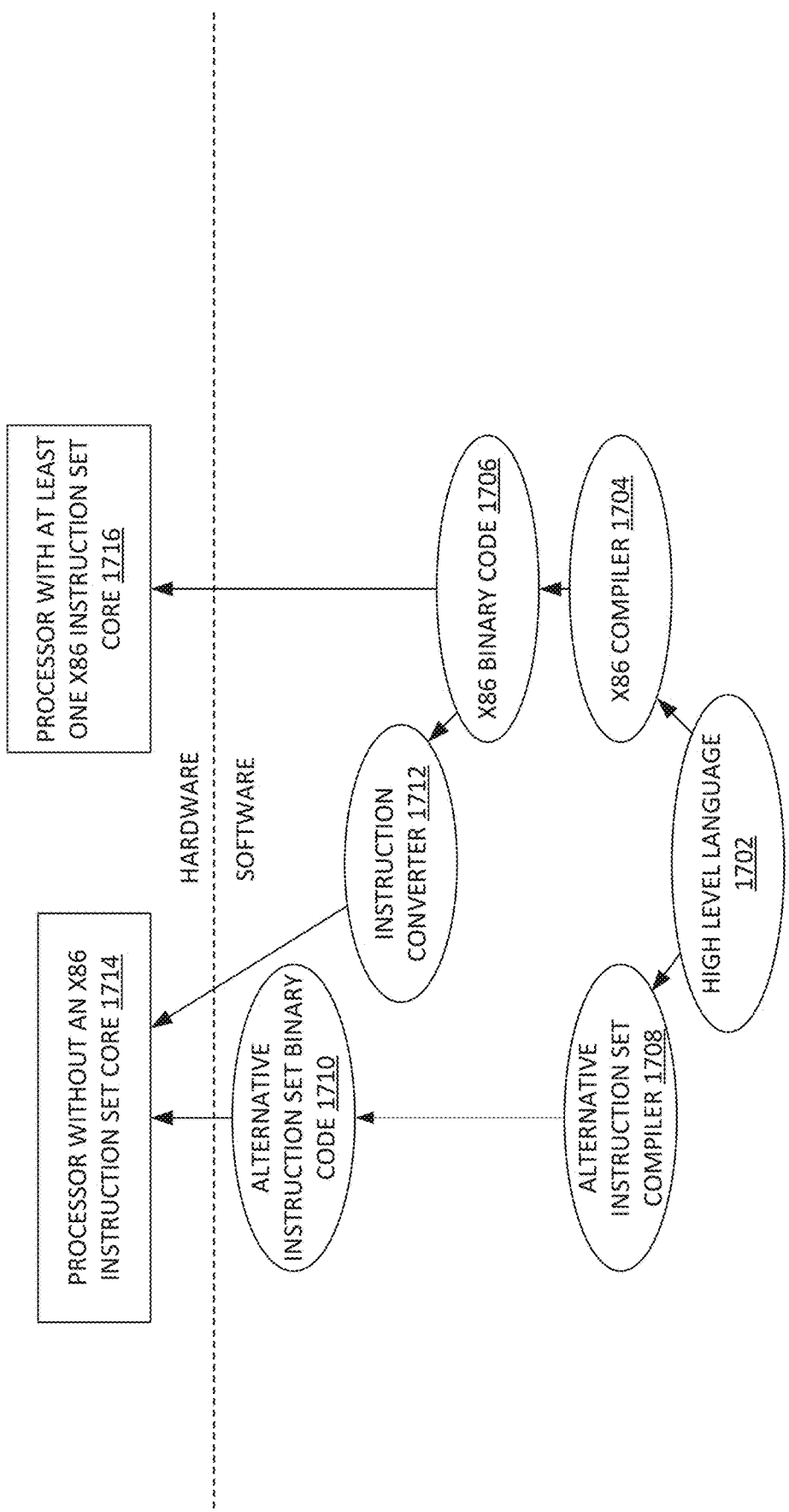

CYCLIC BUFFER POINTER FIXING

TECHNICAL FIELD

This disclosure relates in general to the field of computing systems and, more particularly, to computer processor architectures.

BACKGROUND

Cyclic data buffers are widely used in modern computing. One function of cyclic buffers is to allow one entity (such as a hardware device) to pass data to another entity (such as software or firmware). The data passed via the cyclic buffer may, for example, be in the form of data packets. During conventional operation of cyclic buffers, a block of data may be passed, such as a data packet, and "wraparound" from the end of the buffer to the beginning of the buffer. That is, a data packet may be stored so that it begins near the end of the buffer, and is continued at the beginning of the buffer. When wraparound occurs, data at a later part of the packet is stored at an offset from the beginning of the buffer that is less than an offset at which an earlier part of the packet is stored.

BRIEF DESCRIPTION OF THE DRAWINGS

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention;

FIG. 17 is a block diagram contrasting the use of a software instruction converter to convert binary instructions in a source instruction set to binary instructions in a target instruction set according to embodiments of the invention.

Like reference numbers and designations in the various drawings indicate like elements.

DETAILED DESCRIPTION OF EXAMPLE EMBODIMENTS

Figure 1:
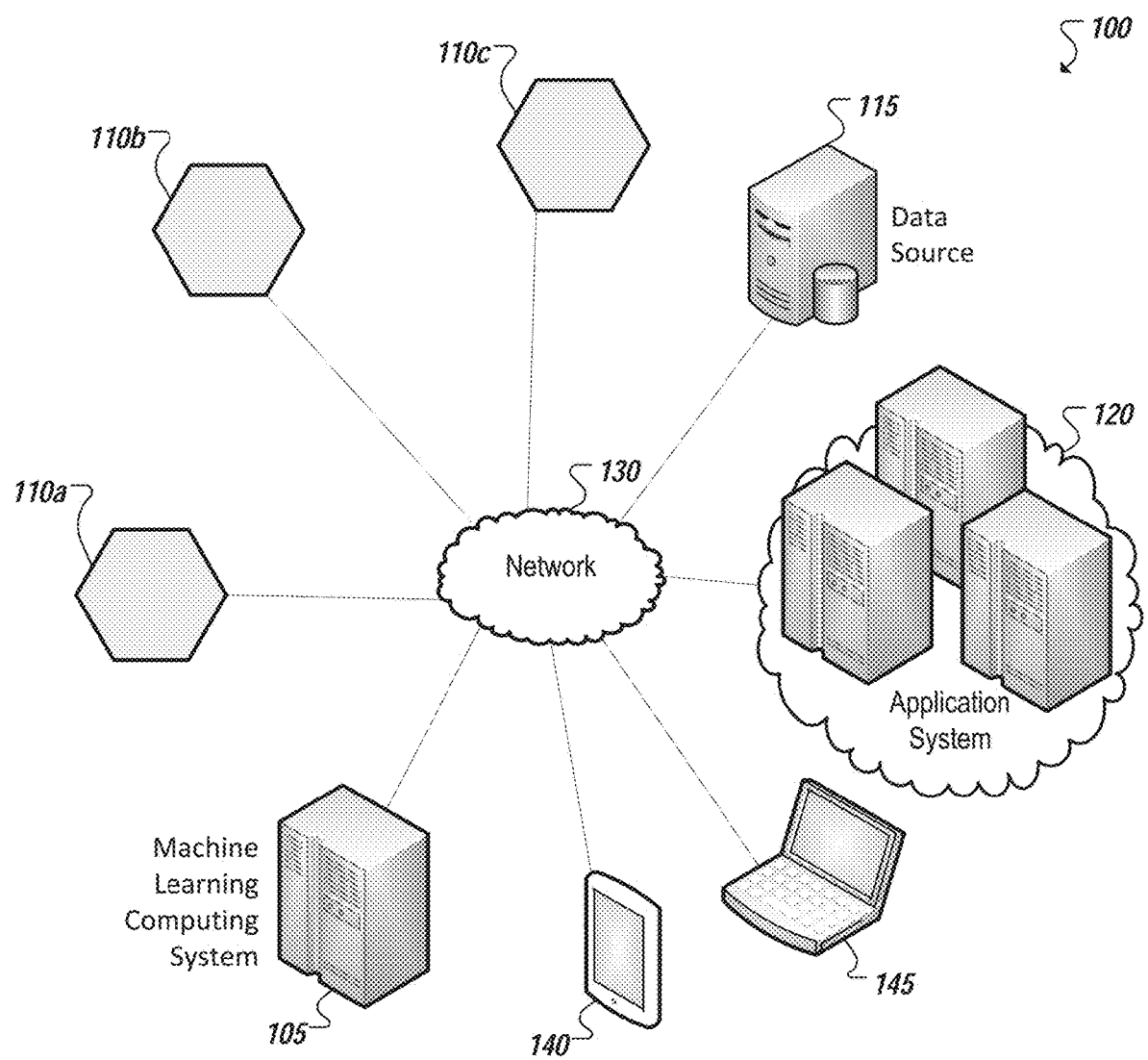
FIG. 1 is a simplified schematic diagram of an example system including a computing system enabled to enhanced cyclic buffer management in accordance with one embodiment.

FIG. 1 illustrates an example computing system including a machine learning computing system 105, which may accept as inputs, data from one or a variety of sources. For instance, sources may include sensor devices (e.g., 110a-c). Such devices 110a-c may detect and/or measure attributes of an environment and generate sensor data describing or capturing characteristics of the environment. For instance, a given sensor may be configured to detect such characteristics as images, video, sound, movement, weight, physical contact, temperature, wind, light, computer communications, wireless signals, humidity, the presence of radiation or specific chemical compounds, among several other examples. Sensors may generate files, numerical data, or data of other formats describing these attributes, audio data, photographic images, video, among other sensor data. Sources may additionally include data stores, such as databases of one or more computing systems (e.g., 115), which may aggregate data and/or generate additional data (e.g., from post processing of the aggregated data), such as in connection with a governmental, enterprise, scientific, or other entity or project. Data from the one or more sources (e.g., 110a-c, 115, etc.) may be provided to the machine learning computing system 105 to perform machine and deep learning on the information encapsulated in the data. Results produced by the machine learning computing system 105 may be additionally consumed, for instance, by an application system 120 hosting one or more other processes, programs, or applications. User endpoint devices (e.g., 140, 145), such as personal computers and mobile devices, may additionally make use of the results generated from or in connection with a machine learning computing system 105, such as through the consumption of the results by one or more applications hosted by the user devices (e.g., 140, 145), presenting the results on a graphical user interface of the user device, among other examples.

In some instances, as implied by the example illustrated in FIG. 1, a machine learning computing system 105 may be provided as a service (e.g., over a network 130) to one or more other systems (e.g., 120, 140, 145). A machine learning computing system 105 may additionally utilize inputs generated by remote systems (e.g., an Internet of Things (IoT) network composed of multiple sensor devices (e.g., 110a-c). In other instances, the functionality of a machine learning computing system 105 may be integrated with any one of the other example systems (e.g., 110a-c, 115, 120, 130, 140, 145, etc.), including devices (e.g., 110a-c), which produce data to be processed using the machine learning functionality of machine learning computing system, systems (e.g., 120) which are to consume results of the machine learning computing system, gateway or data aggregation systems interfacing with various data sources (e.g., 110a-c, 115, etc.), among other examples. For instance, a wearable device or IoT device (e.g., 110a-c) may be provided with machine learning computing resources to operate directly on inputs generated by a sensor of the device. As another example, an application or service may be provided (e.g., by application server system 120), which includes and makes use of machine learning computing resources, among a variety of other examples and use cases. Further, machine learning computing systems may utilized to support or implement products or services based on or utilizing artificial intelligence, including digital personal assistants, chat bots, video games, self-driving cars, robots, and other examples.

In some implementations, an example machine learning computing system (e.g., 105) may be instrumented with hardware and logic to effectively perform machine learning algorithms and tasks, including applications relating to or utilizing deep learning, neural networks, computer vision, speech and/or voice detection, biometric analysis, and other example uses. As machine learning tasks and applications may, in some cases, be resource intensive and latency sensitivity, in some implementations, it may be desirable to implement example machine learning computing functionality using specialty hardware, microarchitectures, instruction sets, firmware, and other hardware and/or software logic to accelerate or enhance the performance of computing tasks relating to the machine learning tasks and algorithms. While such hardware components and logic (included those discussed herein) may be well-suited to use in connection with machine learning applications or machine learning computing systems, it should be appreciated that the functionality, enhancements, and features discussed herein may be potentially employed in any computing system implementation or application.

In general, "servers," "clients," "computing devices," "network elements," "hosts," "system-type system entities," "user devices," "sensor devices," and "systems" (e.g., 105, 110*a-c*, 115, 120, 130, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

As introduced above, software and/or firmware programs may be developed that are configured to perform a variety of different tasks and services, including tasks and services relating to computer vision, deep learning, or another machine learning use case. In some cases, operation of the program may involve sequentially reads/writes from/to a buffer that may be arranged as a circular buffer, cyclic buffer, ring buffer, etc. (collectively referred to herein as "cyclic buffer"). A cyclic buffer may, in some implementations, may be advantageously utilized in connection with a machine learning or other application that is to process a stream or sequence of data with low latency, among other example advantages and use cases. In traditional implementations, in order to utilize a cyclic buffer, a program includes code that explicitly checks the buffer whenever the program updates the buffer pointer it uses to determine whether the pointer has moved beyond the buffer area resulting in a "wraparound" event. In response to determining that the pointer has indeed moved beyond the border, or boundaries, of the cyclic buffer being used by the program, the program may be further coded to "fix" the pointer to return the pointer to within the buffer space (representing the cyclic nature of the buffer).

In traditional solutions, software would be utilized to handles data in the buffer to check to see whether the current packet wraps around and to take appropriate measures to handle wraparound when it occurs. Such packet-handling software may be rather complicated, however, and the possibility of wraparound may also make it difficult or impossible to perform certain functions with respect to a packet stored in a cyclic buffer. Such functions may include parsing the packet, writing data into the packet, copying the packet, or jumping to a point within the packet based on an offset from the beginning of the packet. Further developing code of programs to implement algorithms to manage cyclic buffer wraparounds and fixing of these wraparounds can be cumbersome and error prone, and the resulting software-based logic may significantly reduce the performance capabilities of the code. For example, in machine learning applications realized using code that performs a filter over a region of an image that is loaded chunk-by-chunk into the buffer, the code, when conventionally written, is required to check and fix the pointer every time it is moved (or at least every time it is moving to a different line, if lines are contiguous in memory), among other examples.

In light of the above, while cyclic buffers may be important mechanisms within some applications, traditional management of cyclic buffers and pointer fixing may result in both performance and development issues. For instance, programs, kernels, or other software components developed to perform certain tasks may incorporate cumbersome code to address cyclic buffer fixing. While some solutions may attempt to address this issue by requiring every software component to know, ex ante, about the physical boundaries of the entire buffer, this may be an onerous requirement. Additionally, in implementations where multiple different buffers are used, traditional "fixing" code for the pointers may be required to know about each of the various other buffers used by the software component (and cooperating software components also utilizing such buffers) so as to accurately and appropriately fix the pointers, among other design challenges.

In one example implementation, a cyclic buffer address translation (CBAT) feature may be included or added to a microarchitecture of a computing device (e.g., a general purpose or purpose-built processor device). For instance, CBAT may be provided as a microarchitectural extension to a core, digital signal processor (DSP), or other processor device that is implementing the software or firmware that is to use cyclic buffers and implement pointers within the buffer. Further, a corresponding instruction set architecture (ISA) may be provided to support the CBAT-enabled microarchitecture, exposing new machine operations (e.g., through an API accessible to kernels or other software components run on these microarchitectures) to manage and make use of the CBAT mechanism. This CBAT mechanism may address at least some of the challenges of cyclic buffers, as introduced above. For instance, to assist in improving the manageability and development of program code that is to build upon cyclic buffer structures, the instruction set of the improved microarchitecture may be provided with an instruction that is to program a "context" or a buffer with specific parameters. As an example, the instruction may be used to both define a buffer, set its size, and starting address (e.g., an instruction (or instruction parameters) "CBATset 0x2, 0x100, 0x30000" may cause buffer number 2 to be set to a size of 0x100 bytes with a starting at address 0x30000, among other potential illustrative examples). Additional instructions may also be provided in the instruction set through which the hardware may automate the fixing of the defined pointer within a corresponding cyclic buffer, such that pointer fixing and the physical implementation of the pointer may be abstracted away from the viewpoint of the program run on this enhanced processor, among other example features.

For example, in some implementations, an ISA (and/or firmware) may be provided with an example processor device to expose an operation supported by the enhanced microarchitecture of the processor device to user code that fixes a given pointer within a cyclic buffer immediately, without cumbersome code to define the logic explicitly within the program that is to use the cyclic buffer. For instance, a register "reg1" may hold the pointer that is to be fixed. The fixing operation defined in the CBAT-enabled instruction set may be "CBATfix reg1", which performs the fixing operation directly and which the program or kernel source code (e.g., C source level code) may call simply, for instance through a macro, instruction, function, intrinsic function, or other mechanism (e.g., "FIX_POINTER ptr", etc.), among other examples.

Figure 2A:
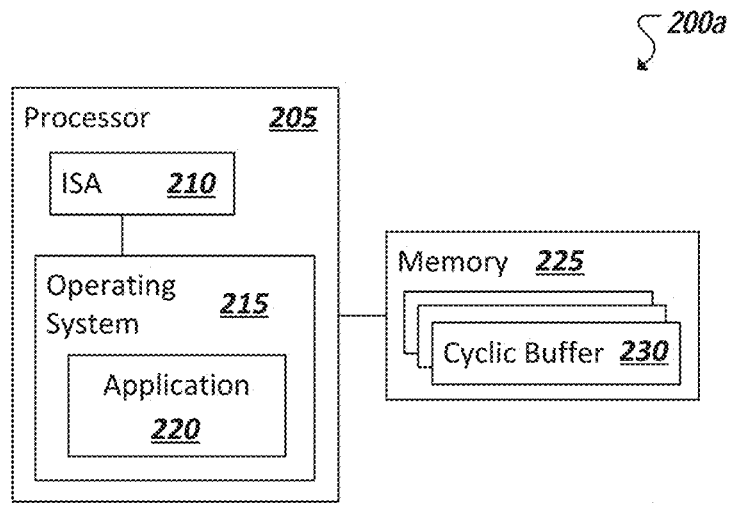
FIGS. 2A-2C are simplified block diagrams of example systems including a processor device enabled to provide processor-based cyclic buffer management in accordance with one embodiment.

Turning to the example of FIG. 2A, a simplified block diagram 200a is shown illustrating an example implementation of a processor device 205 that incorporates an ISA 210 configured to support an operation to automate and abstract away the fixing of a pointer of a cyclic buffer used by one or more software components within a computing environment. The processor device 205 may further implement an operating system 215, which may be used to manage the execution of various software components (e.g., of an application 220), including the assignment of memory 225 for use by each software component. In connection with managing application 220 (or other software components), the operating system 215, in some implementations, may also identify the memory requirements of the software component and reserve portions of the memory 225 for use by the software components. In some instances, one or more cyclic buffers may be identified as being used by a software component (e.g., of application 220) and the operating system may "create" the corresponding cyclic buffer(s) 230 for the software component by reserving ranges of memory 225 and defining the location and size of the cyclic buffer 230. In one example, the ISA 210 may provide an operation to generate such a cyclic buffer 230 based on an instruction from the operating system 215. The creation of a cyclic buffer 230 may include the assignment of a buffer identifier (or "BID") to be associated with the buffer.

As noted above, in some implementations, the ISA 210 of an improved processor device 205 may include further operations to abstract and offload management of cyclic buffers from the application 220 code, with the processor device 205 provided with logic to identify and fix wraparound events of state pointers within the cyclic buffers 230 resulting from the progression of the application 220 code. This functionality of the processor 205 may be accessed in the code of the application 220 (or, more generally, code of a software component) through functions, macros, or other API-provided code, which, when compiled, may invoke operations (such as automated cyclic buffer fixing) provided in the ISA, among other example implementations.

A processor device (e.g., 205) provided with logic to handle management of cyclic buffers, such as in the example of FIG. 2A, may be utilized in a variety of different computing systems and architectures where cyclic buffers may be used. As one example, turning to the simplified block diagram 200b of FIG. 2B, a system on chip (SoC) 235 may be provided on which an accelerator device 245, or computing block, is provided. The accelerator device 245, in this example, may include an implementation of a processor device 205, such as a digital signal processor (DSP), that includes CBAT logic to implement features of cyclic buffer management such as discussed above. In other implementations, the processor device 205 may be provided on an SoC 235 as included in a particular IP block or as another processor node in the system 235, among other example implementations.

Figure 2B:
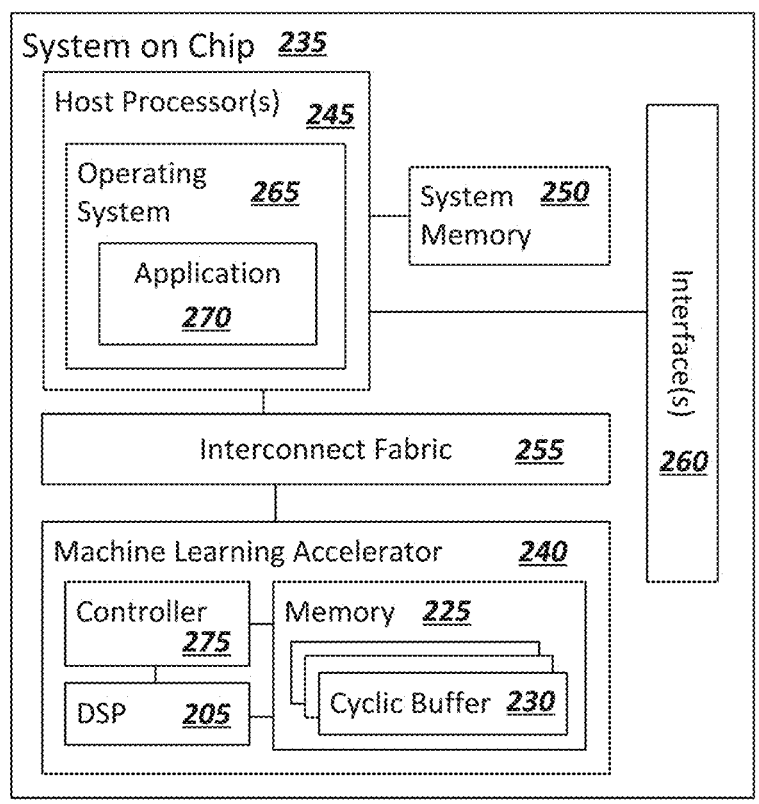

Continuing with the example of FIG. 2B, the SoC 235 may additionally include other components to facilitate software components and other functionality which uses or builds upon the software components utilizing processor device 205 and cyclic buffers 230. For instance, other processor nodes, such as host processors (e.g., 245) and corresponding system memory 250 (e.g., different from memory 225 utilized by the CBAT-enabled processor 205) may be provided on the SoC 235, and these may be used to implement a general purpose operating system 265, in which one or more applications 270 may be run. The SoC may further include an interconnect fabric 255 (e.g., provided using Peripheral Component Interconnect Express (PCIe), UltraPath Interconnect (UPI), Infiniband, or other communication technologies) and one or more interfaces (e.g., 260) to allow the SoC to connect to other system elements (e.g., using a PCIe, Universal Serial Bus, Ethernet, or other interface), among other example features.

In the example of FIG. 2B, host processor 245 may be utilized to run an application 270 that includes logic supporting one or more machine learning tasks. To enhance the performance of this application 270 (as well as other applications), a machine learning accelerator block 240 may be provided that includes various logic (e.g., controlled or orchestrated using a controller 275) and a CBAT-enabled DSP (e.g., 205) that allow the application to be run more efficiently and effectively (as compared to running the application using only the capabilities of the host processor 245). In some implementations, the application 270 can include code that makes use of API calls corresponding to logic in the accelerator 240 generally, and in processor device 205 specifically (e.g., using a communication channel facilitated between the host processor 245 and accelerator 240 using an interconnect fabric 255, among other example implementations.

Figure 2C:
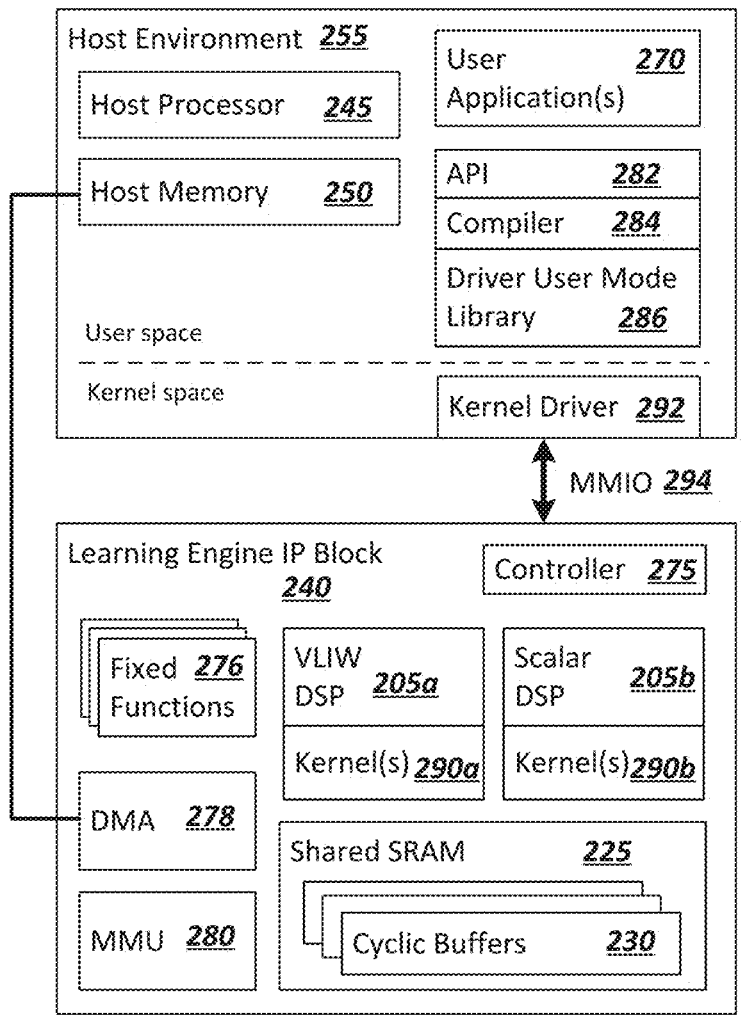

Turning now to FIG. 2C, a simplified block diagram 200c is presented illustrating yet another example of a system, which may include the use of a CBAT-enabled processor device 205 (e.g., CBAT enabled in that the processor device 205 include logic to implement automated management and fixing of cyclic buffers (e.g., 230) in the system). The example of FIG. 2C illustrates at least a portion of a device implementing a computer vision or deep learning engine component (e.g., which may be included in a system (e.g., as an intellectual property (IP) computing block within a SoC) tasked with performing or supporting computer vision or deep learning tasks). In this example, the processor device (e.g., DSP devices 205a and 205b) may (each) include an operating system implemented as master firmware to interface between the hardware (and ISA) of the processor device (e.g., 205a,b) and software kernels (e.g., 290a,b) run using the processors (e.g., 205a,b).

As introduced above, computer vision logic may be implemented in software and/or hardware logic to perform or facilitate the performance of computer vision and deep learning tasks. In some implementations, a computer vision engine (CVE) may be provided that accelerates computer vision and deep-learning tasks. In one example, the CVE may expose a vision acceleration API 282 (e.g., an openVX or other API) to express a computer vision or deep learning algorithm in the form of a graph and it can also execute inference of trained deep-learning networks, among other example features. For instance, through the use of a graph-compiler (e.g., 284), potentially any computer vision, deep learning, or other graph can be compiled to native CVE code (e.g., implemented as a kernel (e.g., 290a,b)) and sent for execution (e.g., by DSPs 290a or 290b, etc.). The compiler 284 may build an efficient pipeline inside the CVE hardware, where different compute building blocks (e.g., fixed functions (e.g., 276 or digital signal processing (DSP) kernels (e.g., 290a,b)) process the data according to the graph topology defining a corresponding user application (e.g., 270). A CVE may also enable users to implement custom kernels for the embedded DSP inside CVE in such a way that they can be made part of an efficient compiled pipeline.

In one example, the main programming API 282 of CVE for external developers may use a graph-based language to describe workloads or algorithms for accelerators. For instance, the CVE may expose the API 282 to application developers by which an algorithm can be defined and sent for execution. Defining workloads as a graph may involve representing underlying algorithms of the workloads as nodes and data passing as vertices. For instance, turning momentarily to representation 500 in FIG. 5, an example graph 500 is illustrated that includes various nodes (e.g., 505, 510, 515, 520, 525, 530, 535) implemented as pre-existing kernels 505, 510, 520, 525, 530 (e.g., native kernels defined according to a standard (e.g., openVX kernels)) and/or as custom or user-defined kernels (e.g., kernels 515, 535) among a potentially endless variety of other graph-based program examples.

Returning to FIG. 2C, in some implementations, an API (e.g., 282) may be provided through which user-nodes may be included in a graph algorithm to be utilized within a computing device. In some implementations, user-node kernels provided in such a graph may not be executed inside a corresponding computer vision or deep learning hardware accelerator, but rather on the host processor itself. In such instances, whenever the corresponding program (e.g., application) is using a user-node as part of the graph, the corresponding data may be streamed out from the accelerator into the host memory 250, where a user-node implementation would process it, and then stream it back into the accelerator. Traditional implementations, such as this, are costly in terms of both bandwidth and performance given the back and forth between the accelerator and host processor 245. In an improved example implementation, such as illustrated in FIG. 2C, custom-defined user nodes may be implemented as a native DSP kernel (e.g., 290a, 290b) that is executed inside an implementation of a CVE and schedulable by the CVE graph-compiler 284. Accordingly, in such implementations, a CVE can expose two levels of programmability: a native level allowing application developers to use graph notation to code an algorithm, based on pre-defined (e.g., specification-defined) nodes such as "upscale", "erode", "extract channel," etc.; and kernel authoring (e.g., using API 282) such that a developer (or other source) can add a new node "type" to the CVE system by providing the corresponding specific DSP implementation (e.g., implemented to the respective ISAs (e.g., CBAT-enabled ISAs) of DSPs 205a-b, etc.). Developers may then create graphs compatible with the CVE that contain the new, custom node types and pre-defined node types.

As further illustrated in the example of FIG. 2C, an example CVE may additionally include components and functionality, including a direct memory access (DMA) block (e.g., 278) (which may be utilized to move data between the accelerator and main system memory), memory management unit (MMU) block (e.g., 280), with an interface between the user space and the CVE accelerator (e.g., 240) provided through memory mapped I/O (MMIO) interface 294, among other examples. In an implementation, utilizing a graph-based application that is to be compiled and use cyclic buffers provided through the CVE accelerator, the system may additionally include a driver user mode library 286 and kernel driver 292 to funnel the graph from the high level application definition to the accelerator, with the graphic compiler translating the graph into the ISA instructions and call provided through the accelerator processors, among other example implementations.

An example CVE, or other hardware accelerator implementing a CBAT-enabled processor device (e.g., 205a,b), may include one or more compute building blocks (CBBs). These CBBs may include fixed functions 276 embedded within the CVE, embedded DSP functions, and kernels (e.g., 290a-b) run on the DSPs 205a-b, among other examples. In one example, a set of base algorithms may be implemented through the fixed-functions CBBs 276, with extended (and even custom) implemented as kernels 290a-b, running on the embedded CBAT-enabled DSPs 290a-b. In one example implementation, all CBBs of the CVE 240 may be connected to one shared-memory 225 (e.g., SRAM) and control network facilitated, for example, by controller 275 and kernel driver 292, among other example implementations. CBB consumers and producers may exchange tokens to signal "data ready" over the control network, according to the graph-compiler 284 decisions. Further, the buffers 230 that are defined on the SRAM 225 as part of the compilation process of the CVE may be cyclic (e.g., to save the need for copying, such as in implementations of a finite impulse response (FIR) filter using the CVE, where using cyclic buffers 230 allows a respective CBB (e.g., 276, 290a, 290b, etc.) to reuse the history data between tiles of data, among other example uses). Accordingly, in some implementations, the CVE may be implemented using processor cores 205a-b that may be adapted to have their hardware extended with logic, states, and new ISA instructions/extensions to optimize handling of cyclic buffers 230. In other cases, the CVE may be purpose-built with a microarchitecture and corresponding ISA (of DSPs 205a-b) adapted to internally manage and abstract away cyclic buffer management, among other example implementations.

Allowing user nodes to be treated as native nodes within an example CVE system may demand that the developers of these custom nodes have an expert understanding of the underlying CVE microarchitecture. In some implementations, aspects of the microarchitecture may be abstracted away to allow easy ramp up and development by developers. By abstracting away details of the microarchitecture, the developer may instead focus attention on the nuances and optimization of the algorithm being developed, rather than understanding and coding to the specific infrastructure features provided through the microarchitecture, such as data movement, configuration and parameter passing, nature of buffers in the CVE local memory (e.g., static random access memory (SRAM), among other examples. As one example, an improved microarchitecture and corresponding instruction set architecture (ISA) may be provided to enable a graph-compiler (e.g., of a CVE) to understand the prerequisites to efficiently scheduling a customer kernel as part of a pipeline and how to efficiently execute it in runtime along with the rest of the graph. Further, a turn-key solution (such as a software development kit (SDK) corresponding to devices implementing the improved microarchitecture) may be provided to assist developers in building kernels and kernel-libraries that are pluggable into device (e.g., CVE) and easily deployable to their market, among other example features. For instance, attributes of the architecture may be effectively abstracted from the developer, such as the nature of buffer size, management of wraparound events in cyclic buffers (e.g., when a piece of data (tile) is broken between the end and the start of the cyclic buffer), among other examples. In the example of abstracting away the cyclic nature of the buffers, allocated by the graph compiler, development may be eased and performance improved. Without such a mechanism (as in traditional systems), a developer may be forced to be familiar with the address and size of each of the buffers as well as the current pointer where the current tile for processing is allocated. As an example, the following example piece of simple kernel code represents the complexity of traditional code used when buffers and buffer management are not abstracted:

```
vec_type *sptr = BUF_PTR(BUFFER0);//sptr is state pointer
vec_type *sbase = BUF_BASE(BUFFER0); //sbase is base point
uuint32_t ssize = BUF_SIZE(BUFFER0); //buffer size define
for (y=0; y < height; y++)
{
    for (x=0; x < width; x++)
        temp += ~ vec_load(sptr,64); //vec load with increment
        if (sptr > sbase + ssize) sptr -= ssize;
}
```

In this example, the developer-user is forced to understand the nature of the cyclic buffer to read the physical base address and size of every buffer and then to explicitly check and fix the pointer inside the inner-loop every time the pointer moves around the barrier. The generated code (above) is both branchy and costly in assembly operations, costing a large (e.g., ~10 or more) amount of cycles just to perform buffer management. In cases where an example kernel is provided that is to work with multiple different buffers (e.g., 5, 10, or more different cyclic buffers), the performance penalty is only magnified further.

An example CBAT mechanism, implemented through an example microarchitecture and corresponding instruction set, may implement various API extensions, including APIs that may be accessed by a kernel to allow pointers to be explicitly updated and fixed. For instance, an API call FixedPtr may be provided which may be translated into a single assembly operation (e.g., CVE_UPDATE_PTR (Ptr, Offset) that may update and fix the pointer (e.g., in a single cycle or less, in VLIW). For instance, through FixedPtr=CVE_UPDATE_PTR (Ptr, Offset), the CBAT-enabled processor device may internally calculate Ptr+=Offset, identify whether fixing of Ptr is needed, and performs the fixing to point correctly into the cyclic buffer without any explicit direction from the software code (e.g., kernel code) using the cyclic buffer. As another example, the API may further define and include calls enabling an implicit overloaded load/store operation combined with pointer post-increment and fixing. For instance, the CBAT-enabled block may support a set of load/store operations that may be performed using only a single assembly operation to perform a sequence of (a) load/store from/to a pointer, (b) post-incrementing of the pointer according to a corresponding offset, and (c) fixing the pointer, after the post-increment operation, if it went outside the boundary of the cyclic buffer. For instance, an intrinsic function may be defined for the CBAT-enabled processor, such as CVE_LVNX8S_XCP v0, Ptr, diff, which loads a vector from Ptr into v0 and then would update and fix Ptr as needed in a single operation.

In accordance with the above, a CBT-enabled processor device may be provided with or extended to support an instruction set architecture configured to manage the hardware's implementation of CBAT features. For instance, firmware (or another operating system implementation (e.g., 215) of a CBAT-enabled processor device (e.g., 205)) may be provided that runs on the CBAT-enabled processing core and makes use of this CBAT-enabled ISA (e.g., 210). The firmware may additionally expose an abstracted kernel development API, as well as perform other management of the processing core. As examples, the ISA (or ISA extensions) used by the firmware to implement CBAT features may include instructions to program or define a buffer (or context) with particular parameter, generating a CBAT pointer for a kernel (e.g., as part of a buffer pointer API implementation), perform fast context switching of the hardware state. For instance, programming a particular cyclic buffer (or set of cyclic buffers) for use by a particular kernel may be according to an instruction or intrinsic function, such as an intrinsic function CBATset, which may be called by the firmware (or other operating system implementation). For instance, CBATset 0x2, 0x100, 0x30000 may be utilized to set buffer number 2 to a size of 0x100 bytes and starting at address 0x30000, among other examples. An ISA function that defines a buffer may further set the hardware state of the processing core (e.g., DSP) and set the foundation for enabling the remaining CBAT features provided for in the ISA. Fast context switching provided within the ISA may be used to read and write the configured CBAT HW state (e.g., defined using CBATset) from/to the SRAM to change the context (e.g., as the processing core toggles between kernels during operation). For instance, CBAT-enabled firmware of the CBAT-enabled processing core may perform such a context switch every time it calls a different kernel along the execution of the graph of a particular application, among other example features.

Enabling a device with a microarchitecture supporting a CBAT feature may allow performance to be improved by allowing pointer management within a cyclic buffer to be completed with 1 or 0 operations (and 1 or fewer cycles) instead of through multiple operations as it presently the case. Further, with the microarchitecture supporting the CBAT feature, programming of software and firmware that is to use the cyclic buffer(s) may be greatly simplified, by abstracting away (from the programmer) the specifics of the cyclic buffer implementation and pointer fixing. CBAT can further improve kernel APIs and software development kits (SDKs) provided to developers building solutions for implementation on example computer vision and deep learning engines, including an example CVE IP block or soft-IP block implemented on a computing system, among other example advantages and uses.

Figure 3:
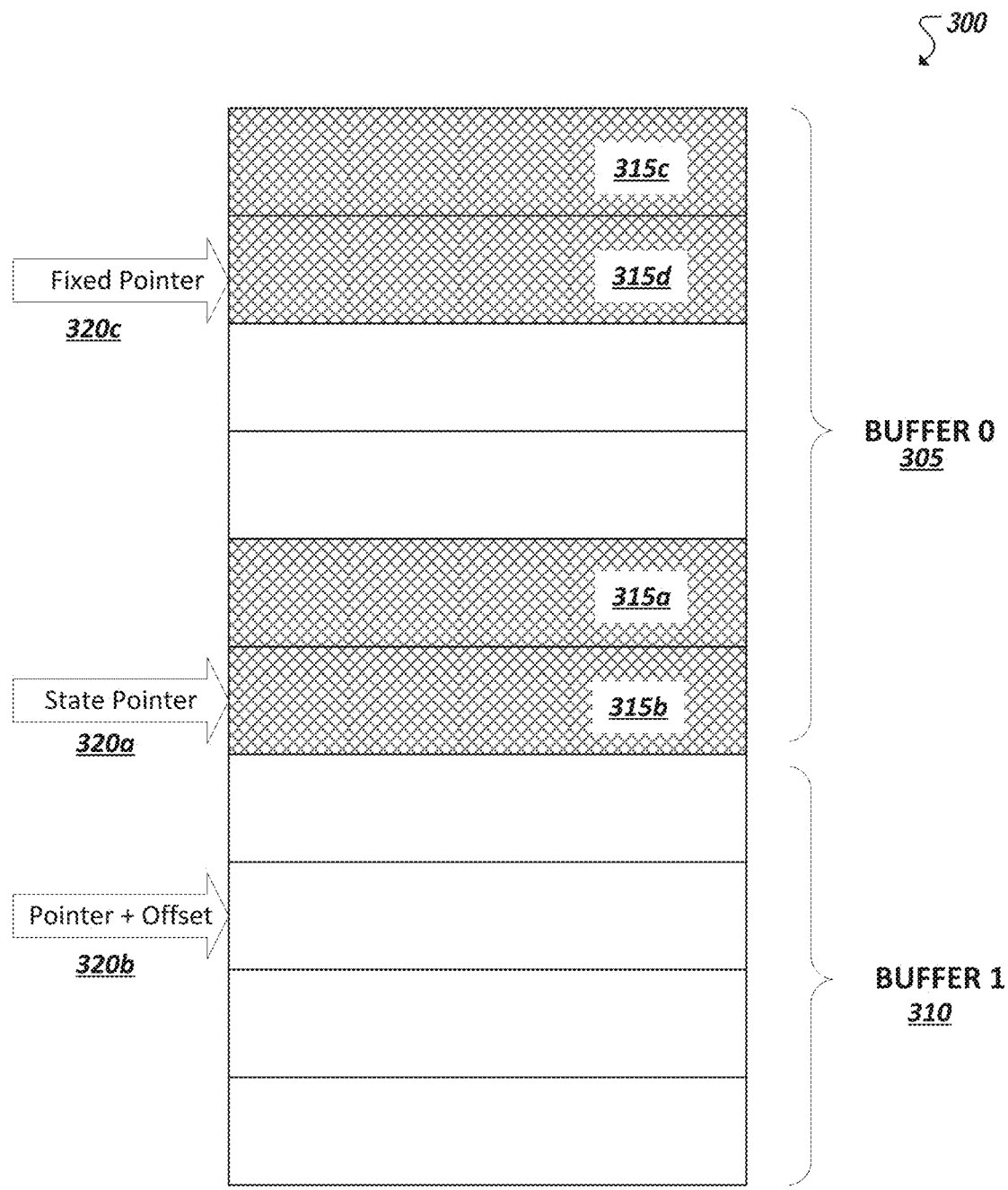
FIG. 3 is a simplified block diagram representing an example cyclic buffer.

Turning to the example of FIG. 3, a block diagram 300 is shown representing an example implementation of a cyclic buffer 305. In this example, one or more software component (such as two computer vision kernels) may utilize the cyclic buffer to load/store data by a first of the software components (e.g., after processing of the data by the first software component) for the second software component to then obtain or read and process according to the logic of the second software component. In this sense, the first software component is a "producer" of data for the cyclic buffer 305 and the second software component is a consumer" of data in the cyclic buffer 305. It should be appreciated that multiple software components may act as producers for the same buffer, as multiple software components may likewise act as consumers of this data.

In the particular example illustrated in FIG. 3, a cyclic buffer (BUFFER 0) has been defined in physical memory, with a second cyclic buffer (BUFFER 1) 310 defined in adjacent lines of the physical memory. Continuing with this example, a first software component (e.g., a first kernel) has loaded data (e.g., image data) in two lines 315a, b of memory assigned to the cyclic buffer 305, with the state pointer 320a pointing to the location of the last entered data in the cyclic buffer 305. This state pointer 320 may be used by another software component (e.g., a consumer) to locate and read or pull this data from the buffer 305 for further processing. The cyclic buffer 305 may be used advantageously, for instance, in applications where real time data is generated sample-by-sample in a stream of data, with one or more pieces of (consumer) logic (e.g., software kernels, hardware-embedded logic, etc.) responsible for accessing and processing the samples as soon as possible as they are generated and loaded to memory by a producer, among other examples.

Continuing with the example of FIG. 3, a producing software component may load blocks of data (e.g., samples) sized such that multiple lines of memory (e.g., 315a-b) in the buffer 305 are written to each time the producing software component performs a load/store to the buffer 305. In this example, a subsequent sample is to be loaded to BUFFER 0 (305), with an increment of the state pointer 320a being incremented in accordance with the size of the incoming sample (e.g., two additional lines). However, as the boundary of the buffer 305 is at line 315b, incrementing of the pointer 320a results in wraparound event, with the pointer plus the offset (in this case increment) placing the pointer (as represented at 320b) outside the boundaries of BUFFER 0 (305) (and instead within the boundaries of another, different buffer, BUFFER 1 (310)). Accordingly, the state pointer of BUFFER 0 (305) is to be "fixed", with the data loaded in the "next" lines 315c-d of the buffer, which are physically located at the beginning of the memory range assigned to BUFFER 0 (305), and the pointer (at 320c) also fixed to be positioned in accordance with the data loaded in lines 315c-d.

A CBAT-enabled processor device may be provided with an instruction set to implement operations supported by the microarchitecture of the processor device to both define new cyclic buffers within a memory as well as maintain records of the defined cyclic buffers' location and size, as well as the current state pointer location for each buffer. The instruction set can further support operations, performed at the processor device, to identify a change (e.g., increment or decrement) of the state pointer for a given buffer. The internal logic of the processor device may, in response to a single CBAT instruction, identify the nature of the change, the specific buffer the pointer applies to, and determine the size, or boundaries, of the specific buffer. Further, the processor device, in connection with the same CBAT instruction, may use information regarding the size of the buffer to determine whether the change results in a wraparound event and perform a fix of the pointer location to resolve the wraparound (e.g., as shown in the example of FIG. 3).

In some implementations, CBAT functionality to manage cyclic buffers within a hardware processor device may be incorporated in infrastructure firmware of the processor device, such as master firmware of a CVE. This infrastructure firmware (or other logic) may manage the cyclic buffers (and even non-cyclic buffers) for the different "kernels," or code particles or other components that are working on these buffers. The infrastructure firmware may use the specialized CBAT-enabled hardware to provide CBAT-compatible pointers to the kernels. In some implementations, a CBAT-compatible pointer (also referred to herein as a "CBAT pointer") may be a pointer that includes an encoding of the corresponding buffer number in the high bits of the pointer.

In one example implementation, the CBAT mechanism may, at the microarchitecture level, enable the infrastructure to store the buffer number, which may then allow the infrastructure (e.g., the ISA operation implementation) to automatically identify the correct context of an identified pointer such that it can be automatically corrected (or "fixed") using the same processor infrastructure. In one example, the buffer number may be coded in high unused bits of the pointer itself, among other example implementations. Such an approach may greatly simply the software/firmware program interface, as only the pointer would be transferred as part of the fix operation. For instance, in connection with the CBAT-enabled processor and corresponding API, a state buffer with a specialized format (or "CBAT pointer") may be defined to allow the hardware to be "taught" about the physical buffers that various software components (e.g., kernels) are using. More specifically, to understand the parameters of a physical buffer (implementing a cyclic buffer), the hardware should know the base address and size of each of potentially multiple different buffers used by the currently executing software component. For instance, in one implementation, each software component may be permitted to use multiple discrete cyclic buffers, with the parameters of each of these buffers presented to and known by the enabled processor device. Given this information for each of the buffers, the enabled processor ISA may expose one or more ISA instructions (e.g., to be called by corresponding processor firmware or other operating system implementation that may fix, in a single operation and/or single cycle, a pointer for any one of these cyclic buffers.

A CBAT pointer may have be particular useful in implementations where multiple cyclic buffers may be utilized by a particular software component. For instance, only sending a traditional state pointer to the hardware via a CBAT ISA operation may not be sufficient to enable the hardware to automatically perform pointer fixing for the software component, as the hardware needs to know which of the buffers (e.g., as identified by the corresponding buffer index or identifier (0-15)) the pointer is pointing into. For example, consider two adjacent buffers in memory, indexed 0 and 1 and a pointer belongs to buffer 0 that was advanced by the kernel beyond the border of buffer 0 and now points into buffer 1. Fixing the pointer in this example would involve identifying that the pointer is for buffer 0 (and not for buffer 1).

Accordingly, in one example, a specialized pointer format may be defined to enable a CBAT feature in a system. For instance, from an interface and hardware perspective, pointers may be converted to an example CBAT pointer (also referred to herein as "pointer identifier") in accordance with the illustration of FIG. 4. It should be appreciated that for the sake of brevity, the pointer identifier for a given state pointer, as well as the state pointer itself may be referred to in this discussion collectively as "pointer."

Specifically, in this particular example, a CBAT pointer format may be defined that includes the state pointer (SP) address (e.g., line number of the state pointer or offset of the state pointer from the buffer base address, etc.) in an address field assigned to the lowest bits of the CBAT pointer and a buffer identifier field 410 in higher bits of the pointer, which may be encoded with a BID number of the cyclic buffer to which the pointer applies. Further, the pointer may be provided with one or more cushion bits 415 positioned between the address field 405 and the buffer ID field 410 to protect the integrity of the buffer ID field. As an example, the cushion bits 415 may be encoded with a binary value "01" or "10" to provide a cushion protecting the BID 410 from the lower bits of pointer 405, such as in cases where a buffer is adjacent to the start/end of the entire memory's address range (e.g., where the address is all or mostly all "1's" or "0's") and the risk exists that the software code will move, or change, the pointer beyond the buffer border (e.g., where a kernel attempts to read back, behind a pointer, causing the pointer address to "fall off" the start of the buffer causing the pointer to be wrapped back to the end), among other examples.

Figure 4:
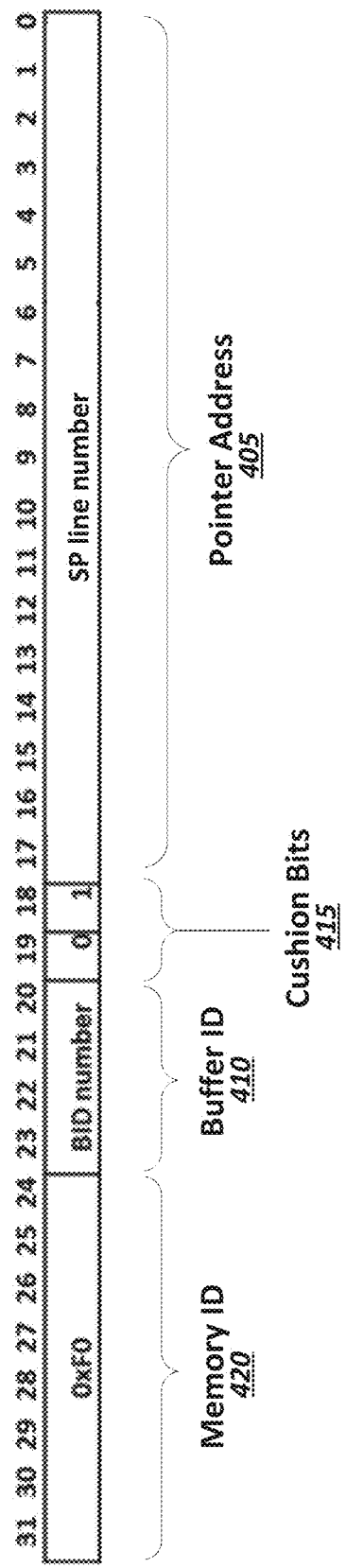
FIG. 4 is a simplified block diagram representing an example pointer identifier in accordance with one embodiment.

As an illustrative example, such as shown in the example of FIG. 4, for a local memory of 256 KB, the lower 18 bits of the CBAT pointer is designated as the pointer address field 405 for encoding the 18 bits of the pointer's address. Traditional pointers may consist only of this pointer address. The high bits of the example CBAT pointer (e.g., bits 20-23) may be used as the buffer ID field 410 to encode the buffer number, while additional high bits (e.g., bits 18-19) are coded to a special pattern (e.g., "01") to provide a cushion 415 that guards the buffer encoding (e.g., in cases where the pointer is being moved below 18'b0 or above 18'b1, for instance, when a program has a buffer that is located at the start of memory and is moving the pointer back from the beginning of the buffer it may threaten the integrity of the 4-bit buffer number), among other example implementations.

As noted above, CBAT-enabled processor devices may receive and process CBAT pointers to identify the context of the cyclic buffer identified in the CBAT pointer. In some implementations, an example CBAT pointer may be provided with additional fields (e.g., 420) to further assist CBAT-enabled hardware to manage cyclic buffers and their pointers. As an example, an optional memory identifier field 420 may be provided in the high bits (e.g., bits 24-31 in the example of FIG. 4) to identify the start of a range of memory that is designated for cyclic buffers to be managed by the CBAT hardware. For instance, in the example of FIG. 4, from the hardware perspective, the data memory is mapped to 0xf0000000, with the actual region of the 256 KB physical memory in the range of 0xf0000000 and 0xf0040000. Accordingly, memory ID field 420 may be provided in this particular implementation of the CBAT pointer and may be encoded, in this example, with the start address (e.g., 0xf0000000) of the memory region corresponding to the identified buffer (e.g., to differentiate the memory designated for implementing buffers from other memory (e.g., where code or other data is located)). In other implementations, a memory ID field (and other potential or optional fields) may be omitted from CBAT pointers defined and used within such implementations, among other example features and implementations.

In some implementations, to enable a processor block to correctly handle CBAT pointers including the additional high bit encoding of BID and other information and avoid the risk of aliasing in the high bits, the processor core may be configured with a larger memory (e.g., SRAM) than the size actually used. For instance, as shown in the example of FIG. 4, for a core memory of 256 KB, the CBAT-enabled processor core may be instead configured for 4 GB, effectively tricking the processor core into sending all CBAT pointers dereferencing to the SRAM rather than to the default system memory interface. An example CBAT-enabled processor may additionally be provided with a microarchitecture or logic to trim the high bits from the CBAT pointer when the processor is using this pointer to access the external memory for read/write transactions. As an example, a CBAT-enabled DSP may be configured (or extended) to handle CBAT pointers by leaving extra interface pins (e.g., pins 18-31 of a 32 bit register translation language (RTL) port of the DSP) dangling to cause the longer CBAT pointers (e.g., for 4 GB, 16 MB (e.g., when the memory ID field is removed)) coming from the DSP's load/store pipe to be translated back to the memory's natively-supported pointer lengths by zeroing the high bits and providing a valid (e.g., 256 KB) pointers into the memory. Other implementations may utilize other techniques to adapt the CBAT pointers for other memory systems. For instance, some implementations of a CBAT-enabled processor device may be natively constructed to handle the removal of the extra CBAT pointer high bits to address similar issues, among other examples.

As noted above, an example CBAT pointer may be defined and provided with fields to encode the corresponding buffer identifier (or "BID") in some of the high bits of the pointer. This encoding however, may be provided by the CBAT hardware or its related operating system logic, rather than requiring the developer and the software to know the details of the cyclic buffer to be utilized by the software component. For instance, an associated API may be provided, which abstract the acquisition and definition of the CBAT pointer, such that the hardware, through the API, builds the (CBAT) pointer with the added buffer index (BID) in response to a call from the software component requesting a pointer for a cyclic buffer to be used by the software component. Such a CBAT pointer may be provided to the kernel as part of a buffer pointer acquisition API call. In one example, the software component code, upon requesting and receiving the CBAT pointer from the CBAT-enabled hardware (or its firmware or operating system), may ignore fields (e.g., 410, 415, 420, etc.) ion the high bits used, for instance, to identify the physical location of the cyclic buffer (at 420), its BID (e.g., at 410), and cushion (e.g., 415). Instead, the software code may simply perform regular pointer manipulation and pointer arithmetic on the pointer to only affect the lower bits of the pointer address 405, relying on the CBAT-enabled microarchitecture to automatically identify and fix any wraparound issues that may be presented through the kernel's now-simplified pointer management code.

In some implementations, an instruction set provided to facilitate the CBAT mechanism may include a fusion of load/store operations along with the CBAT pointer correction and auto-increment operations. Further, a CBAT API and/or software development kit (SDK) may provide calls, macros, functions, classes, routines, objects and other building blocks, which may be integrated into code of software components that are programmed to utilize cyclic buffers enhanced using CBAT-enabled hardware and firmware. In one example implementation, the API can define macros (e.g., C macros) to be included in code of an example program, where the macro is translated according to the ISA into a single operation (e.g., to be performed in a single cycle or less, such as a very long instruction word (VLIW)). For instance, some of the macros may cause a pointer associated with the example program to be updated and fixed automatically using an example CBAT instruction. As an example, a code block CBATgetptr( ) may be called to request a CBAT pointer for a particular buffer. For instance, upon activating the execution of a particular software component, the CBAT operating system (e.g., processor firmware) may determine the number and sizes of buffers for use by the software component and may assign CBAT buffer ID (BID) numbers to each. When the software component requests a pointer for any one of these assigned buffers, the CBATgetptr( ) call may be used to cause the CBAT firmware to generate the CBAT pointer (encoded with the appropriate CBAT BID) and return the CBAT pointer to the software component for subsequent use by the software component. Other code building blocks may allow the software component to request the CBAT-enabled processor to perform updating of the cyclic buffer pointer. As an example, a code block CBATupdateptr (ptr, diff) may be provided, which may be included in the code of the software component to cause the CBAT-enabled processor to perform the updating of the pointer location, as well as determine whether a wraparound occurs from the update and fix the wraparound when detected. For instance, the parameter "ptr" may be a CBAT pointer, which is to be passed to the CBAT-enabled processor to correctly identify the corresponding buffer, its boundaries, and location of the pointer before and after the proposed update (specified by the "diff" parameter indicating the scope of the increment or decrement of the pointer's location).

Additional operations may be supported by a CBAT-enabled processor device and exposed through an API for use by software components relying on cyclic buffers. For instance, a CBAT-enabled processor may support instructions and corresponding operations to not only handle updating and correction of pointers, but to perform such pointer correction together with a corresponding load/store operation used by the program with no additional explicit additional commands or instructions. For instance, CBATload (ptr,val,diff) may be utilized to load data from a register "val" into a cyclic buffer corresponding to pointer "ptr", with an offset being applied to the pointer based on an amount defined through parameter "diff". This (like other API calls) may be translated to a corresponding machine operation of the CBAT-enabled ISA, such as a machine operation "CBAT_LOAD_PI ptr, val, diff" to cause the processor to load from the pointer "ptr" location in memory a value, which will be returned through a "val" register, and at the same time update the pointer "ptr" to the value of ptr+diff as well as fix pointer "ptr" with respect to the buffer it is pointing to.

Additional CBAT instructions and operations may further enrich a corresponding API, with other operations supported which may involve the movement of a cyclic buffer pointer and fixing of the pointer should it wraparound the boundaries of the cyclic buffer. For instance, in one example, gather/scatter operations to the local memory may be natively supported (e.g., through a corresponding ISA instruction) to implement a vectorized version of the CBAT mechanism. This may allow, for example, the transparent load or store from/to arbitrary set of offsets in a buffer that is cyclic in nature, among other example implementations. Other operations and corresponding calls may be defined, which may be implemented in software code, such as the examples outlined in Table 1 below.

TABLE 1

| API CALL | DESCRIPTION |
| --- | --- |
| initCBATptr (ptr, BID) | Generates a CBAT pointer for a given CBAT buffer ID idx |
| CBATaddBIDptr (outptr, inptr, idx) | Converts a regular (non-CBAT pointer in to a CBAT pointer of CBAT BID idx |
| updateCBATptr(ptr, diff) | Adjusts a CBAT pointer ptr by a value diff and fixes the pointer in the event of a wraparound. |
| CBATsetGSaddress (gsa, ptr, baseptr, part) | ½ gather-scatter offset register compilation from 16 CBAT pointers, with subtraction of base-pointer to allow the CBAT mechanism to be provided in a vectorized mode (e.g. to work on multiple pointers/offsets rather than a single pointer/offset) |

Some instructions and operations provided through a CBAT-enabled microarchitecture and corresponding ISA may be provided for use by the firmware or other operating system of the CBAT-enabled processor. For instance, the initial setting of a single cyclic buffer by the firmware in the microarchitecture state may be called using an instruction setCBATsingle (idx, base, size), where the BID of the new buffer is assigned the value "idx," the base address or pointer of the new buffer is set to the memory address "base," and the size of the buffer is "size." Additional example instructions may also be provided for use by the firmware (or other operating system) in connection with the firmware directing the execution of various software components and provisioning memory, including cyclic buffers, for use by these software components. Table 2 includes some additional example instructions:

TABLE 2

| INSTRUCTION | DESCRIPTION |
| --- | --- |
| storeCBATIIpart (addr, part) | Stores a configured HW CBAT state into memory |
| loadCBATIIpart (addr, part) | Load a CBAT state. |
| loadCBATstate (addr) | Load an entire CBAT state in a single vector load operation. |
| CBATupdateSize (part) | Calculate sizes of at least some of the buffers (e.g., one fourth) and stores in HW CBAT state |

Figure 5:
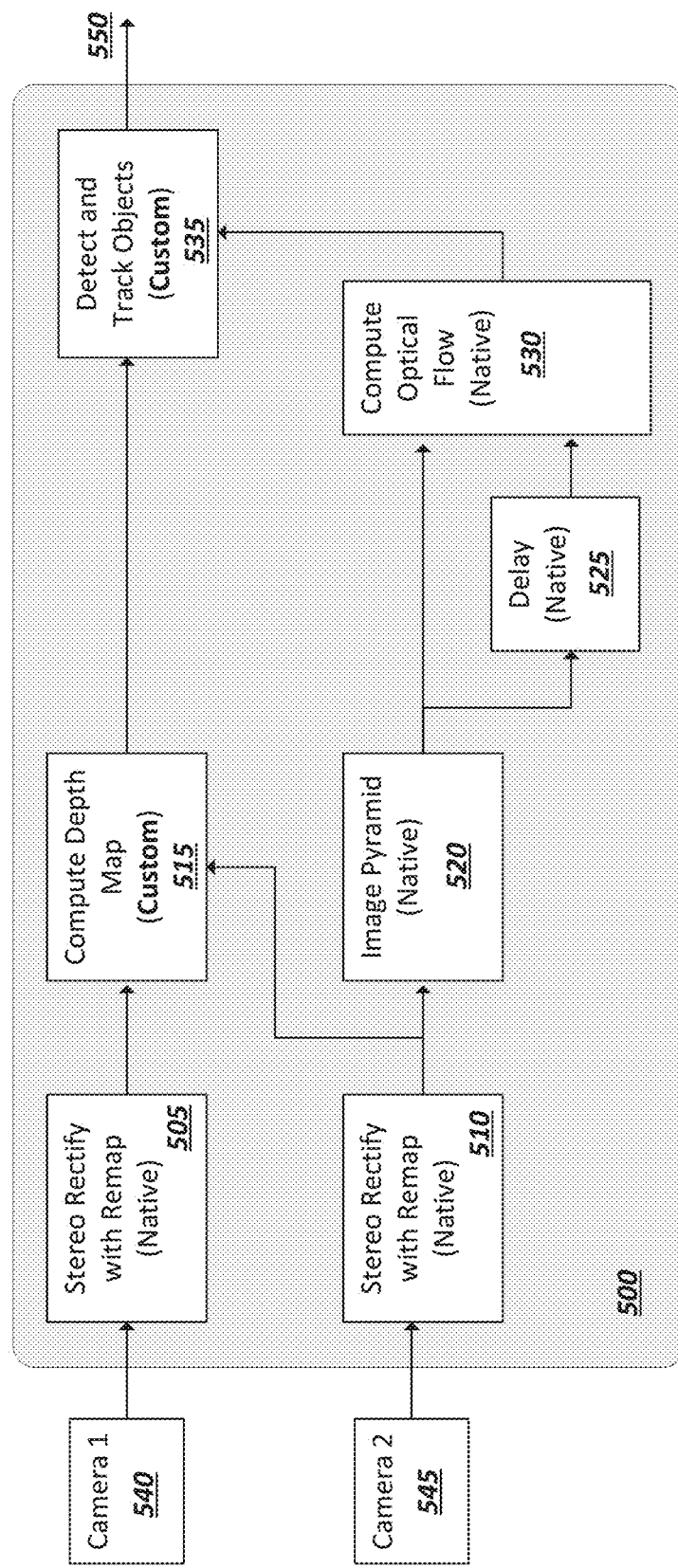
FIG. 5 is a simplified block diagram representing an example graph in accordance with one embodiment.

Turning now to the example of FIG. 5, a simplified block diagram 500 is shown illustrating an example application defined according to a graph 500. In this example, the graph may be utilized for computer vision, with a variety of graph nodes (e.g., 505, 510, 515, 520, 525, 530, 535) defined to process image or video data (e.g., generated and provided by camera sensors (e.g., 540, 545). The pipeline(s) defined within the graph between the graph nodes may specify producer-consumer relationships between nodes (and their corresponding kernels). For instance, stereo rectify nodes (e.g., 505, 510) may generate processed data, which is loaded in a cyclic buffer for access and further processing by a computer depth map node (e.g., 515). A graph compiler may compile the graph definition to cause kernels to be instantiated for execution on an example CBAT-enabled processor. As noted above, some of the kernels may be "native" kernels, in that they are standardized or predefined kernels (in some cases tuned to the CBAT-enabled processor. Other kernels may correspond to user-defined, or custom, graph nodes (e.g., 515, 535). Kernel code may make use of an API defined in accordance with the ISA of the CBAT-enabled processor to include calls, which invoke the automated cyclic buffer pointer management and fixing provided through the microarchitecture of the processor. Firmware, or an operating system, associated with the CBAT-enabled processor may utilize the graph definition 500 to identify the set of cyclic buffers to be used in the corresponding kernels and orchestrate the execution of these kernels to realize the flow defined in the graph to generate a result 550, among other example features.

Figure 6:
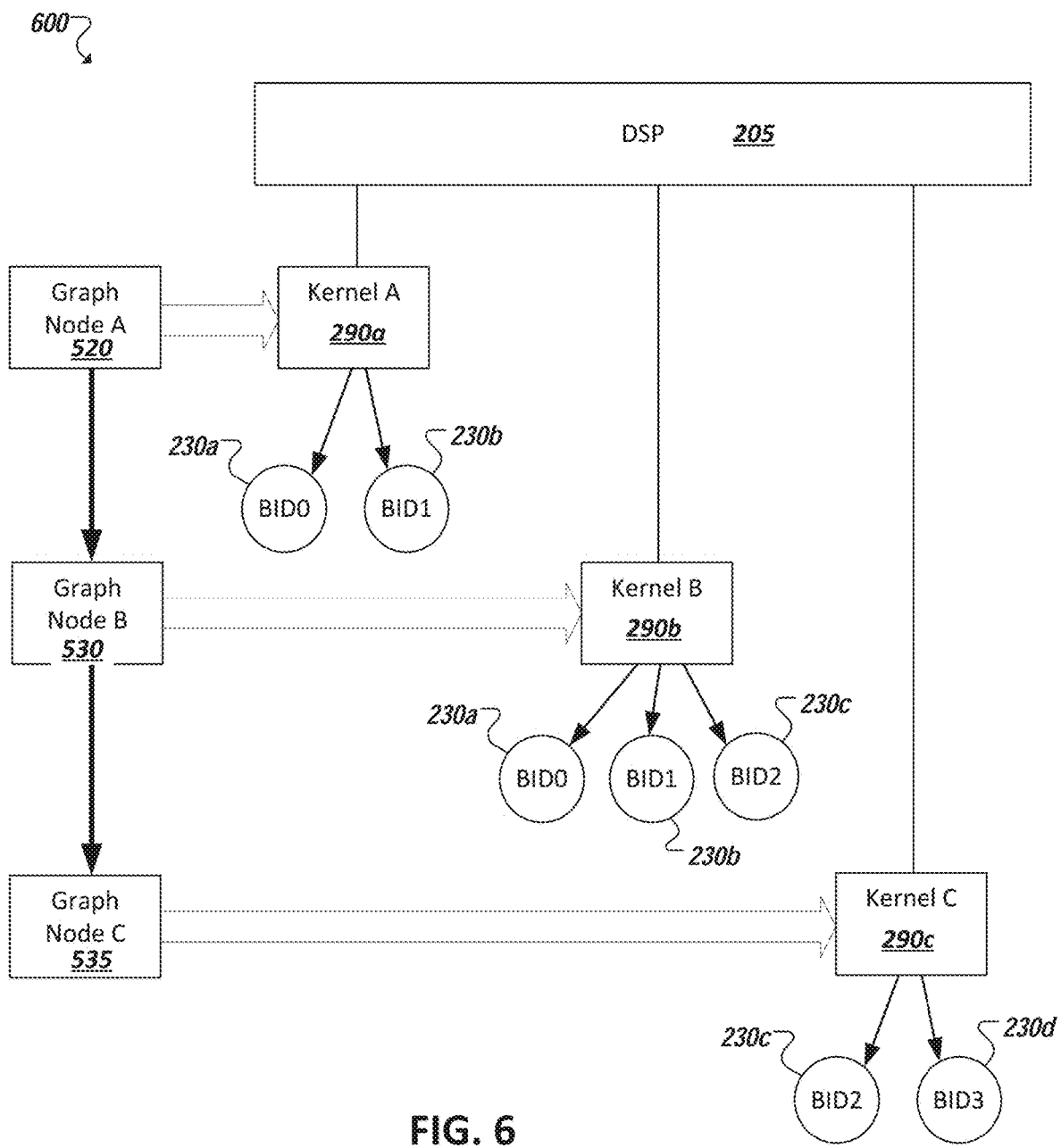
FIG. 6 is a simplified block diagram representing the assignment of cyclic buffers to various kernels of a graph-based application, in accordance with one embodiment.

Turning now to the example of FIG. 6, as noted above, a specialized CBAT pointer may be defined to include the encoding of the buffer ID (BID) in high bits of the pointer, which may be fed through instructions to the CBAT-enabled processor to allow the processor, in connection with its CBAT operations (and, in particular, the CBAT fix pointer operation), to identify the context of the buffer to allow performance of the pointer management and fixing in a single operation. As an example, in one implementation, multiple buffers (corresponding to respective "contexts") may be allowed for each of potentially multiple kernels (or other software components) in an application run on the CBAT-enabled processor. As a result, the CBAT-enabled hardware may track each of the potentially multiple contexts, including the start and end physical location of each of the buffers and their respective buffer identifiers (BIDS), among other example information.

FIG. 6 shows a simplified block diagram 600 illustrating a set of kernels (e.g., 290*a-c*) that are instantiated from corresponding graph nodes (e.g., 520, 530, 535) provided in a graph application definition (such as the graph 500 shown and discussed in the example of FIG. 5, among other examples). A CBAT-enabled processor 205, such as a CBAT-enabled DSP, may execute each of the kernels 520, 530, 535 based on the graph definition and under the direction of the operating system (e.g., firmware) of the processor 205. Further, a set of cyclic buffers (e.g., 230*a-d*) may be defined according to the identified requirements of each of the kernels (e.g., 290*a-c*) as determined during compiling of the corresponding graph (e.g., by a graph compiler). The CBAT processor logic may define cyclic buffers of corresponding sizes in memory and associate the cyclic buffers with one or more of the kernels. In some cases, the kernels may be identified as producers and consumers of data for particular cyclic buffers to be used in the application. Each cyclic buffer may be defined and tracked by the CBAT-enabled hardware (e.g., 205) by a CBAT BID assigned to the buffer (e.g., by the DSP firmware).

In the particular example of FIG. 6, a first Kernel A 290*a* (corresponding to graph node 520) may be implemented with code utilizing two buffers to load data generated from processing of data by the kernel 290*a*. The firmware of DSP 205 may assign two cyclic buffers 230*a*, 230*b* to the kernel 290*a* and assign the buffers BID0 and BID1 respectively. The firmware may call an instruction of the DSP ISA to generate these buffers 230*a*, 230*b* based on the code of Kernel A upon first beginning execution of the kernel 290*a*. Kernel B 290*b* may be defined to take, as an input, the outputs of Kernel A. Accordingly, as the consumer of this data, Kernel B 290*b* may be assigned cyclic buffers 230*a* and 230*b* for accessing these inputs and may be assigned a third cyclic buffer 230*c* for storing the resulting output of Kernel B's processing. The third cyclic buffer 230*c* may likewise be created using the DSP 205 and may be assigned a buffer identifier BID2. As another example, a third kernel, Kernel C 290*c*, may be defined to take the output of Kernel B 290*b* for processing to generate an output. The DSP firmware may therefore generate a fourth cyclic buffer 230*d* (and assign it BID3) for the storing of Kernel C's output and further associate Kernel C 290*c* with buffer 230*c* created for holding the result of Kernel B 290*b*, which Kernel C 290*c* is to use as an input, and so on. The code of each of the kernels 290*a-c* may be initially blind as to where, in memory, these buffers 230*a-d* are created, and may also not have visibility into the initial state pointer location of these buffers or the respective buffer IDs. This can greatly simplify the coding, and thereby the development and performance of these kernels 290*a-c*, among other example advantages. In one example, to access and use these DSP-managed cyclic buffers 230*a-d*, the kernels 290*a-c* can request CBAT pointers corresponding to their assigned buffers, which the DSP firmware (or alternatively DSP microarchitecture) may then provide, such as discussed above (e.g., in the example of FIG. 4).

Figure 7:
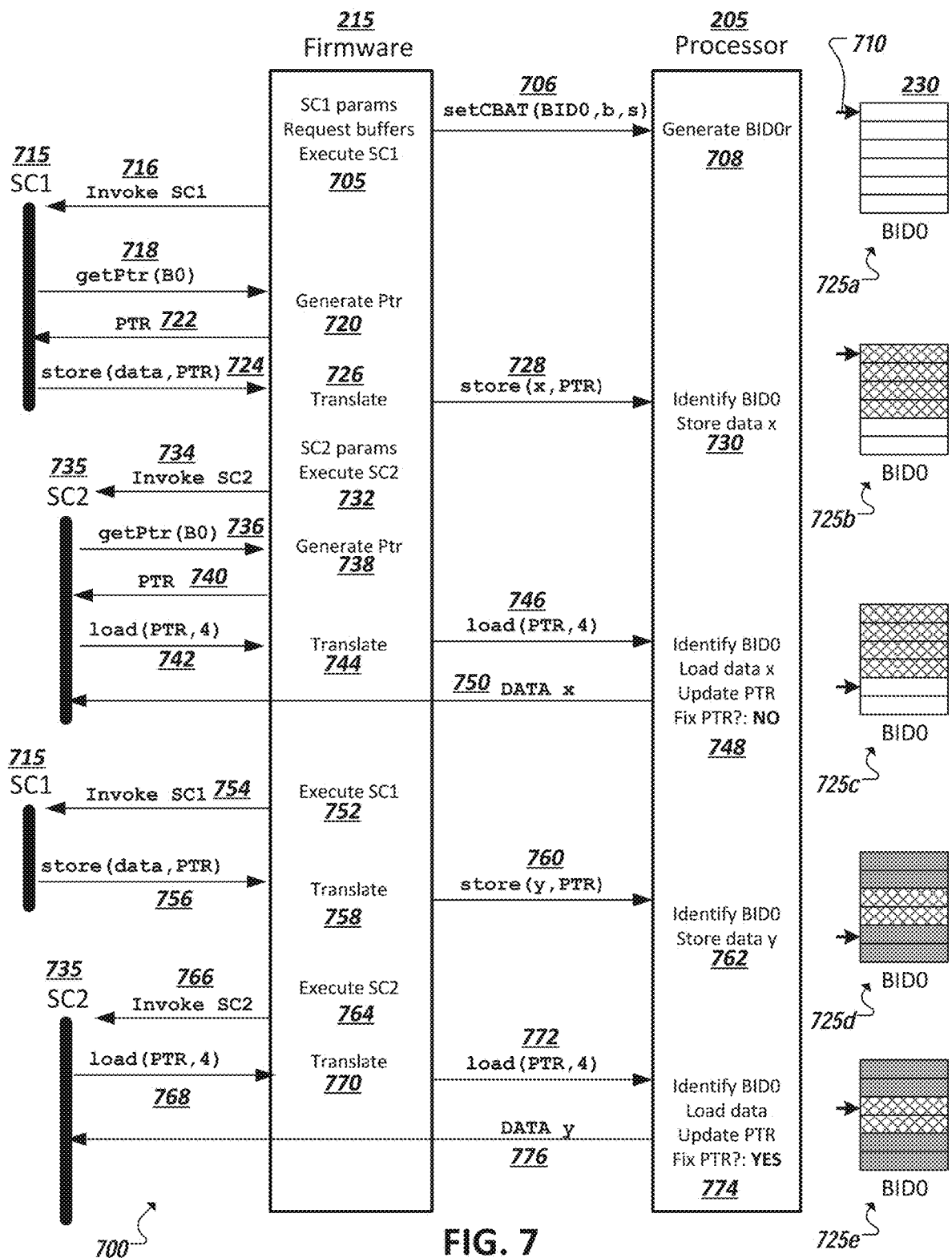
FIG. 7 is a simplified flow chart illustrating operations of a processor device to perform cyclic buffer management and pointer fixing, in accordance with one embodiment.

Turning to the example of FIG. 7, a simplified flow diagram illustrates an example implementation of a system including CBAT-enabled hardware, including a CBAT-enabled processor device 205 with a microarchitecture and ISA to support CBAT functions, firmware 215 of the processor 205 (or, alternatively, another implementation of an operating system executed using the processor 205), and an application composed of multiple software components. The firmware 215 may manage the execution of the pieces of code, or software components, of the application. The firmware 215 may (at 705) identify the parameters of one or more of the software components and identify the number and size of cyclic buffers to be used by the components. The firmware 215 may make use of an instruction (e.g., 706) defined in the processor ISA to cause the processor 205 to generate the cyclic buffer(s) 230 and initialize a state pointer 710 of the buffer 230. For instance, the instruction 706 may specify the buffer ID (BID0) of the buffer, the base address (b) of the buffer, and the size (s) of the buffer, which the processor 205 may use to generate the buffer 230 (e.g., whose state, at this point, is represented by block diagram 725*a*). In some implementations, the instruction 706 may take, as parameters, vectors to identify the buffer IDs, base addresses, and sizes of multiple cyclic buffers to be generated 708 for use by the application's software components, among other examples.

The firmware 215 may determine that a particular one of the application's software components, SC1 (715), is to be executed first by the processor 205 and may invoke 716 SC1. The code of SC1 (715), prior to using the buffer, may first include a call (e.g., as defined in an API corresponding the CBAT-enabled hardware) to get a CBAT-defined pointer. For instance, SC1 (715) may send a getPtr request 718 that includes an identification of the buffer (e.g., "B0") as it is defined in the code of SC1 (715). The firmware 215 may receive the request 718 and identify the buffer (e.g., 230) that was generated to correspond to SC1's identification of the buffer and may generate a CBAT buffer (at 720) and return the pointer (Ptr) 722 to SC1 (715) for further use.

Continuing with this example, upon receiving (at 722) the CBAT pointer, SC1 (715) may then use the CBAT pointer PTR as a parameter of another call (e.g., 724), such as a call to store data (e.g., as identified as a value or address (e.g., to a source register, etc.) in the buffer 230 at the location corresponding to the pointer PTR. Accordingly, the firmware 215 may translate 726 the call into an instruction 728 of the CBAT-enabled ISA, to cause the processor (at 730) to identify the buffer (e.g., from the BID included in the CBAT pointer PTR), determine the base address, size, and pointer of the buffer (from the BID) and store the data ("data x") in the buffer (e.g., as represented by block 725*b*).

The firmware 215 may orchestrate the performance of the various software components of a program and may determine that a software component SC2 (735) is to be executed. The firmware 215 may again determine (at 732) the parameters of the software component, including which cyclic buffers to be generated for the program are to correspond to SC2 (735), and may cause SC2 (735) to be executed (at 734). SC2 (735) may also identify that a particular buffer (e.g., buffer B0) is to be used by SC2 (735) and may request the corresponding CBAT pointer from the firmware 215 (e.g., using the getPtr call (at 736). The firmware 215 may then determine that cyclic buffer BID0 230 maps to buffer "B0" and may generate 738 and return (or provide the previously generated (at 720)) CBAT pointer to SC2 (at 740). In this example, SC2 (735) may be a consumer of data in buffer 230 and may use the pointer PTR in a load call 742 (e.g., defined in a CBAT-enabled hardware API) to pull data from the buffer for use by SC2 (735). For instance, call load(PTR,4) 742 may indicate that data at the present pointer is to be loaded from the buffer 230 and cause the pointer 710 to be incremented 4 lines, among other examples. The firmware 215 my receive the call 742 and translate it (at 744) into a corresponding ISA instruction (e.g., 746). This instruction 746 may be processed by the processor 205 to perform one or more operations 748 that both identify the buffer 230 (e.g., from a BID field included in the pointer PTR), determine the boundaries of the buffer 230, determine the location of the pointer 710 (e.g., from an address field in the pointer PTR), update the location of the pointer 710, determine whether the update causes the pointer 710 to leave the boundaries of the buffer 230 (e.g., a wraparound), and load the requested data (data x). Further, the operation 748 may further involve the processor 205 fixing the pointer if a wraparound event is identifier. In this example, the pointer 710 of the buffer 230 (as represented by block 725*c*) is not in a wraparound state, so the processor 205 refrains from performing a corresponding fix.

Continuing with the example of FIG. 7, execution of the application may continue with the firmware 215 determining (at 752) that SC1 is to be again invoked (at 754) to allow SC1 to load more data into the buffer 230. Accordingly, SC1 may perform some pointer arithmetic (e.g., using the CBAT pointer PTR it received (at 722) from the firmware 215) and generate an update address value of PTR to again use a store call 756 (that includes the updated PTR address), which the firmware 215 may translate 758 into a corresponding instruction 760 to cause the processor 205 to identify the buffer BID0 and store data "y" into the buffer 230 at the present location of the state pointer 710 (as reflected at 725*c*). In this example, the processor 205 may identify that the length of data y, after pointer 710, is greater than the boundaries of the buffer 230 and may automatically write the data 762 to the buffer 230 to wrap the data around to beginning of the buffer, as shown in 725*d*.

Execution may continue, as shown in the example of FIG. 7, with the firmware 215 switching (at 764, 766) to SC2, to allow SC2 (735) to read the newly written data (e.g., data y). SC2 (735) may first perform pointer arithmetic to update the value of CBAT PTR (e.g., as received at 740) such that PTR, when provided in a subsequent load call 768 reflects the current location of pointer 710 (as represented in block 725*d*). This load call 768 may be translated 770 into a corresponding ISA instruction 772 (as before) to cause the processor to again perform a CBAT load/pointer update operation 774. More particularly, the processor 205 may identify the buffer 230 from the BID in the pointer PTR, determine the boundaries of the buffer 230 and the current location of the pointer 710, load the data beginning at the present pointer location, update the pointer's 710 location accordingly, and determine (and fix) wraparound events resulting from the updating of the pointer 710. In this example, the processor (at 774) determines that a wraparound will occur from the pointer update and performs the fixing of the pointer location in connection with loading of data y 776 in response to load instruction 772. Block 725*e* reflects the new position of the pointer 710 as fixed by the processor during operation 774. The execution of the application, as directed by firmware 215, may continue (in accordance with the principles already illustrated in this example), with the processor managing (on behalf of the software) the location and fixing of pointers (e.g., 710) within cyclic buffers (e.g., 230) used by the software's components, among other examples.

As illustrated in the example shown in FIG. 7, a CBAT-enabled processor device may expose a instructions and code building blocks to allow more efficient operation of software executed on the processor device and utilizing cyclic buffers. Further, the provision of these building blocks (e.g., through a corresponding API and software development kit (SDK)) may make implementation of this software more efficient and less error-prone. As an example (as compared to the example above), a software component, which makes use of these CBAT building blocks, may be efficiently coded such as in the example below:

```
vec_type *sptr = BUF_PTR(BUFFER0);
for (y=0; y < height; y++)
{
    for (x=0; x < width; x++)
        temp += ~ CBATvec_load(sptr,64); //vec load with increment
}
```

It should be appreciated that the examples above represent pseudocode illustrations of some of the functions, calls, instructions, macros, and other code building blocks that may be employed to realize the software components, APIs, ISA instructions, and other features discussed in this disclosure. Further, it should be appreciated that the example systems and implementations illustrated and discussed above are presented for illustration purposes only and do not represent limiting examples of the broader principles and features proposed in this disclosure. Indeed, a variety of alternative implementations may be designed and realized that include or are built upon these principles and features, among other example considerations.

Figure 8:
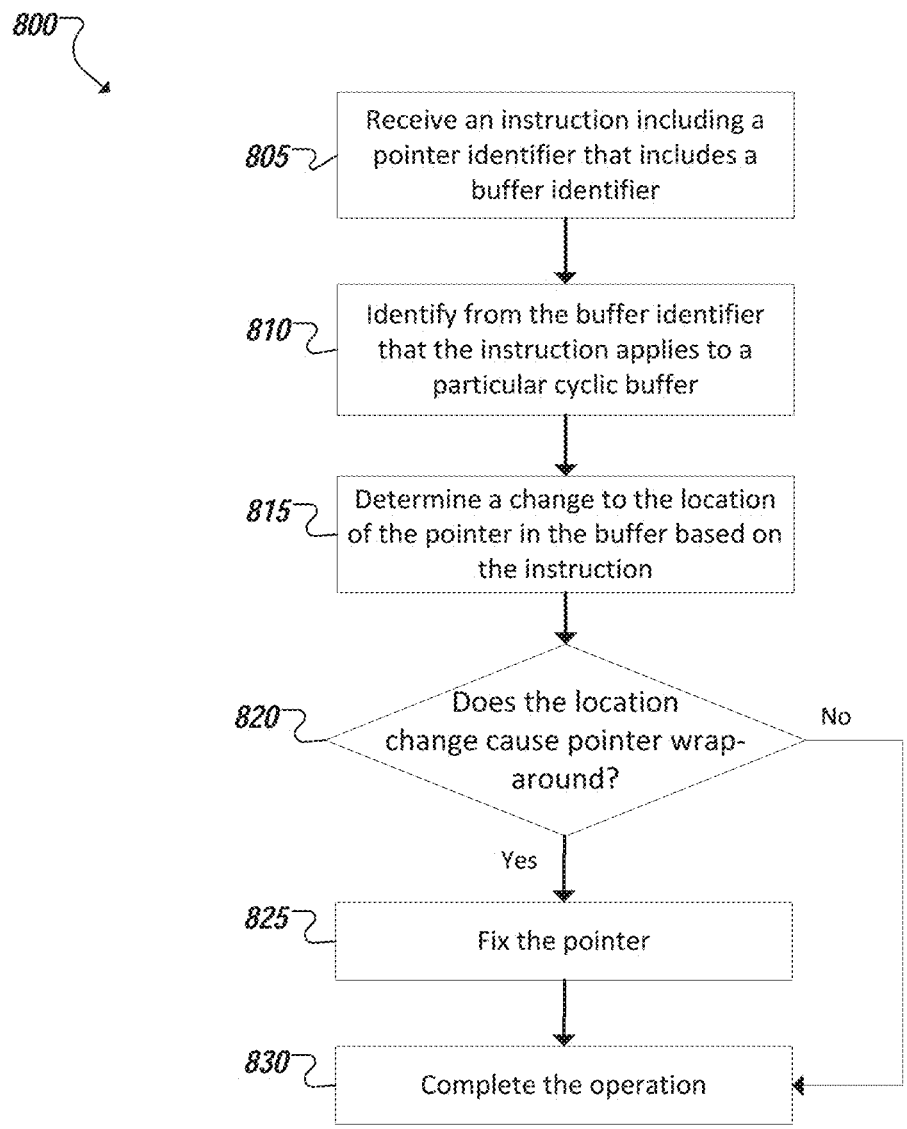
FIG. 8 is a simplified flow chart showing example techniques for cyclic buffer management and pointer fixing in accordance with at least some embodiments.

FIG. 8 is a simplified flowchart 800 illustrating an example technique for utilizing a processor device that has a microarchitecture supporting the management and fixing of cyclic buffer pointers on the processor device (thereby abstracting details of the buffers and the management of their pointers away from software making use of these buffers). For instance, an instruction may be received 805 in a processor to cause the processor to perform one or more operations. The instruction may correspond to a call made in a piece of software code of a program being executed using the processor. The instruction may include one or more parameters, including a pointer (or "pointer identifier") that is to identify a pointer of a particular cyclic buffer being used by the program. For instance, the pointer identifier (also referred to herein as a "CBAT pointer"), may designate certain bits, or "fields", within the pointer identifier for the encoding of certain information relating to the pointer identifier. This pointer identifier may be enhanced from traditional pointer identifiers that merely identify the address of a cyclic buffer pointer. The specialized pointer identifier, here, may include a pointer address field encoded with an address of a line of memory corresponding to the location of the pointer in the cyclic buffer, a cushion field encoded with one or more cushion bits, and a buffer identifier field encoded with a buffer identifier assigned to the particular cyclic buffer in which this pointer is found.

The processor may possess hardware-implemented logic to implement a microarchitecture that supports the instruction and the corresponding operations. For instance, the processor may identify 810 from the received pointer identifier (and more particularly the BID encoded in the pointer identifier) the particular buffer to which the instruction applies. The instruction may be an instruction that involves an update to the pointer, as well as potentially some access or change to data stored in the corresponding buffer. The processor may additionally identify characteristics of this cyclic buffer, including its location in memory and its size, based on the BID. From the instruction, the processor may determine 815 a corresponding change to the location of the pointer in the particular cyclic buffer. For instance, the instruction may include an additional parameter indicating an amount by which the pointer is to be decremented or incremented before or after performing other tasks (e.g., loads, stores, etc.) associated with the instruction. In other cases, the processor may determine the amount by which the location should change based on the size of data involved in the request, a defined increment/decrement amount associated with the instruction or the buffer itself, among other examples.

The processor may additionally determine (at 820) whether the change to the pointer location would result in a wraparound, or the positioning of the pointer outside the boundaries of the buffer in memory. If a wraparound is detected, the processor (e.g., in the same operation) may fix 825 the buffer, allowing the underlying software code to be completely ignorant of the need to fix the buffer when making its calls (e.g., as defined by a CBAT API). In the alternative, if no wraparound results from the change to the pointer location, the processor may simply change the location of the pointer within the buffer, and complete 830 the operation(s) corresponding to the instruction, among other example implementations and features.

In some implementations, the examples features, implementations, and system described above may be further enhanced A CBAT mechanism may be implemented through a processor that includes cyclic buffer address translation (CBAT) logic (e.g., implemented in hardware and/or firmware, hardware/microcode, hardware finite-state-machine (e.g., an application specific integrated circuit (ASIC)), etc.) to define and manage one or more cyclic buffers in a memory. In one example, an instruction, such as a CBATset, may supported by the processor (and included in the ISA of the processor), that, when executed by the processor causes a memory address range to be allocated to implement a cyclic buffer and associate a buffer identifier with the cyclic buffer. An encoding of the instruction may include one or more fields to specify, for instance, the buffer identifier, any one of a starting memory address for the cyclic buffer, an ending memory address for the cyclic buffer, a size of the cyclic buffer, or a combination thereof. In some implementations, the corresponding cyclic buffer pointer value may be maintained at a memory storage location, the memory storage location to include a first portion to store the cyclic buffer pointer value and a second portion to store the buffer identifier. The second portion may include high-order bits of the memory storage location. Additionally, the examples above may be enhanced to support a CBAT fix instruction (and/or capability), that when executed by the processor causes a cyclic buffer pointer value referencing a memory address outside the memory address range to be modified, by the processor to reference a memory address inside the memory address range. In one implementation, an encoding of the instruction includes one or more fields to reference the cyclic buffer pointer value. For instance, if the pointer value is stored in a dedicated register, the pointer could be referenced implicitly, for instance, by the buffer ID, by contextual information for the particular thread, by the opcode for the instruction if it is associated with a single cyclic buffer (e.g., CBATfix1, CBATfix2, etc.), among other examples. The one or more fields may include a register identifier field to reference a register storing the cyclic buffer pointer value or memory address information to access the cyclic buffer pointer value. Additional instructions may be provided such as a load instruction (e.g., CBAT_LOAD_PI to load a pointer from memory to register, increment pointer by indicated amount, modify pointer value, store modified pointer value to memory, etc.), a store instruction (e.g., CBAT_STORE_PI), among other example implementations.

FIGS. 9-17 detail exemplary architectures and systems to implement embodiments of the above (such as the processors utilized in the neuromorphic computing device implementing the example SNNs described above). In some embodiments, one or more hardware components and/or instructions described above are emulated as detailed below, or implemented as software modules. Indeed, embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Figure 9:
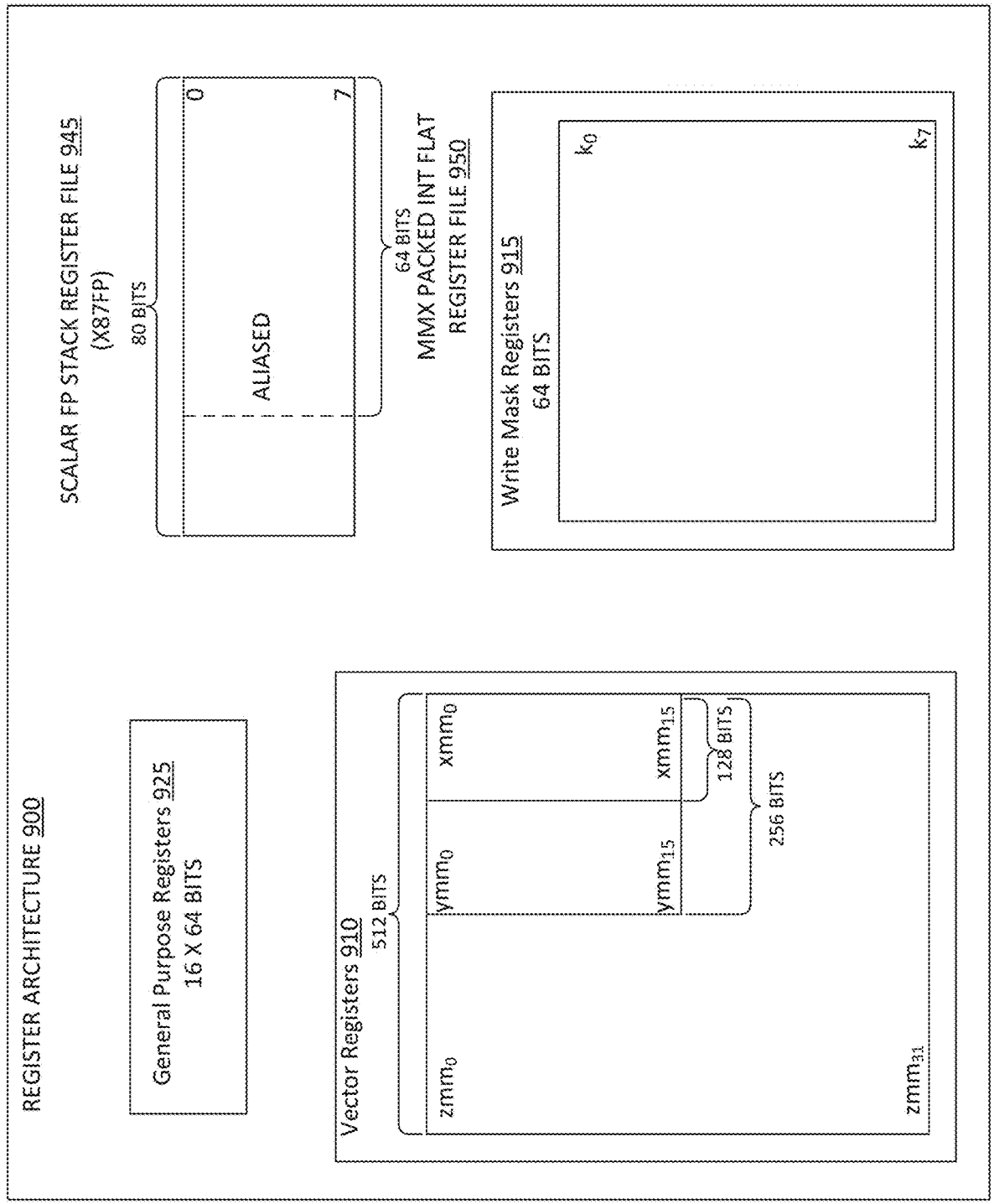
FIG. 9 is a block diagram of a register architecture according to one embodiment of the invention.

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

In other words, the vector length field selects between a maximum length and one or more other shorter lengths, where each such shorter length is half the length of the preceding length; and instructions templates without the vector length field operate on the maximum vector length. Further, in one embodiment, the class B instruction templates of the specific vector friendly instruction format operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-10B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB)

1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11B:
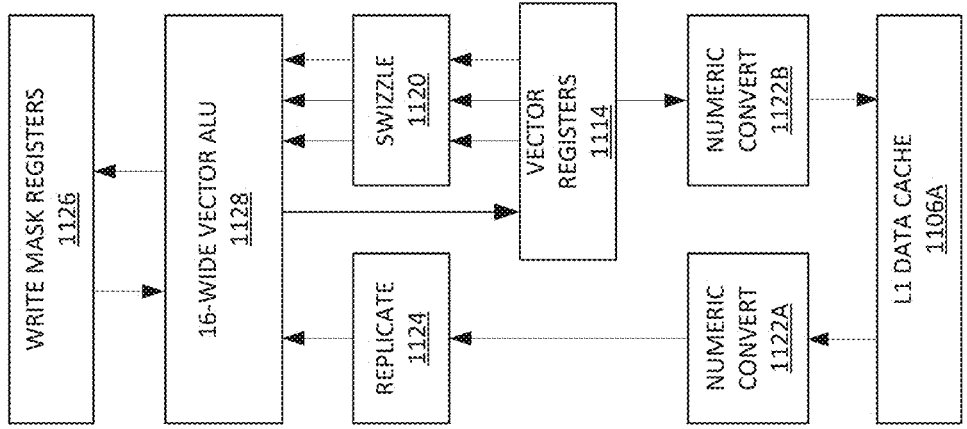
FIG. 11A-11B illustrate a block diagram of a more specific exemplary in-order core architecture, which core would be one of several logic blocks (including other cores of the same type and/or different types) in a chip.
Figure 11A:
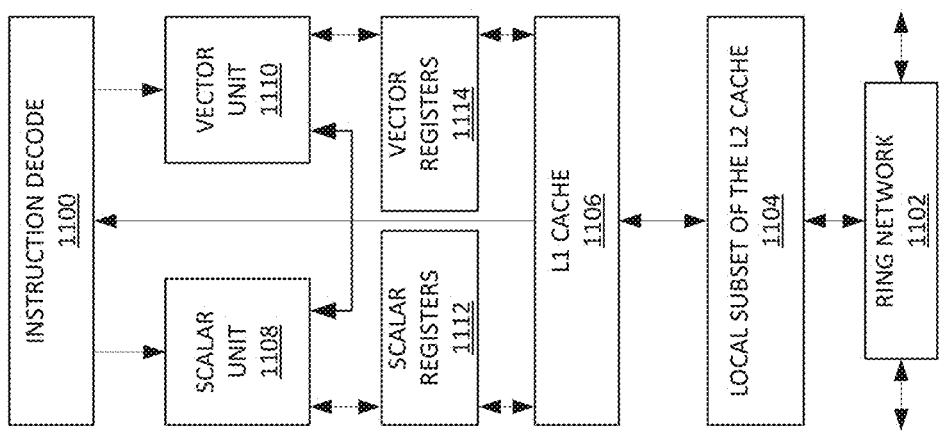

FIGS. 11A-11B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
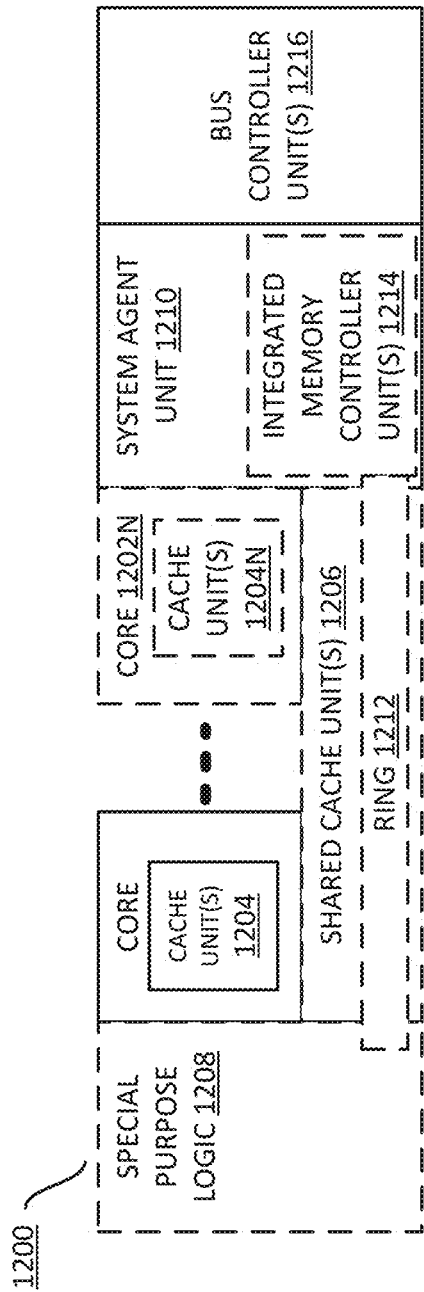
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
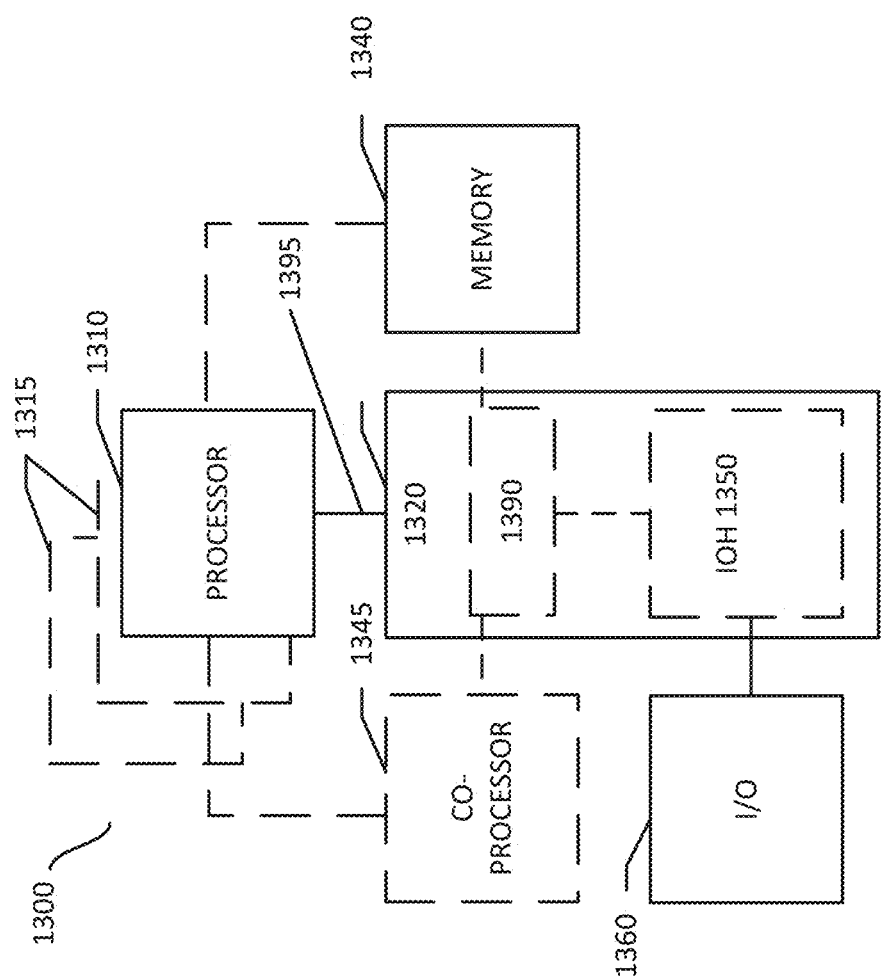
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), UltraPath Interconnect (UPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
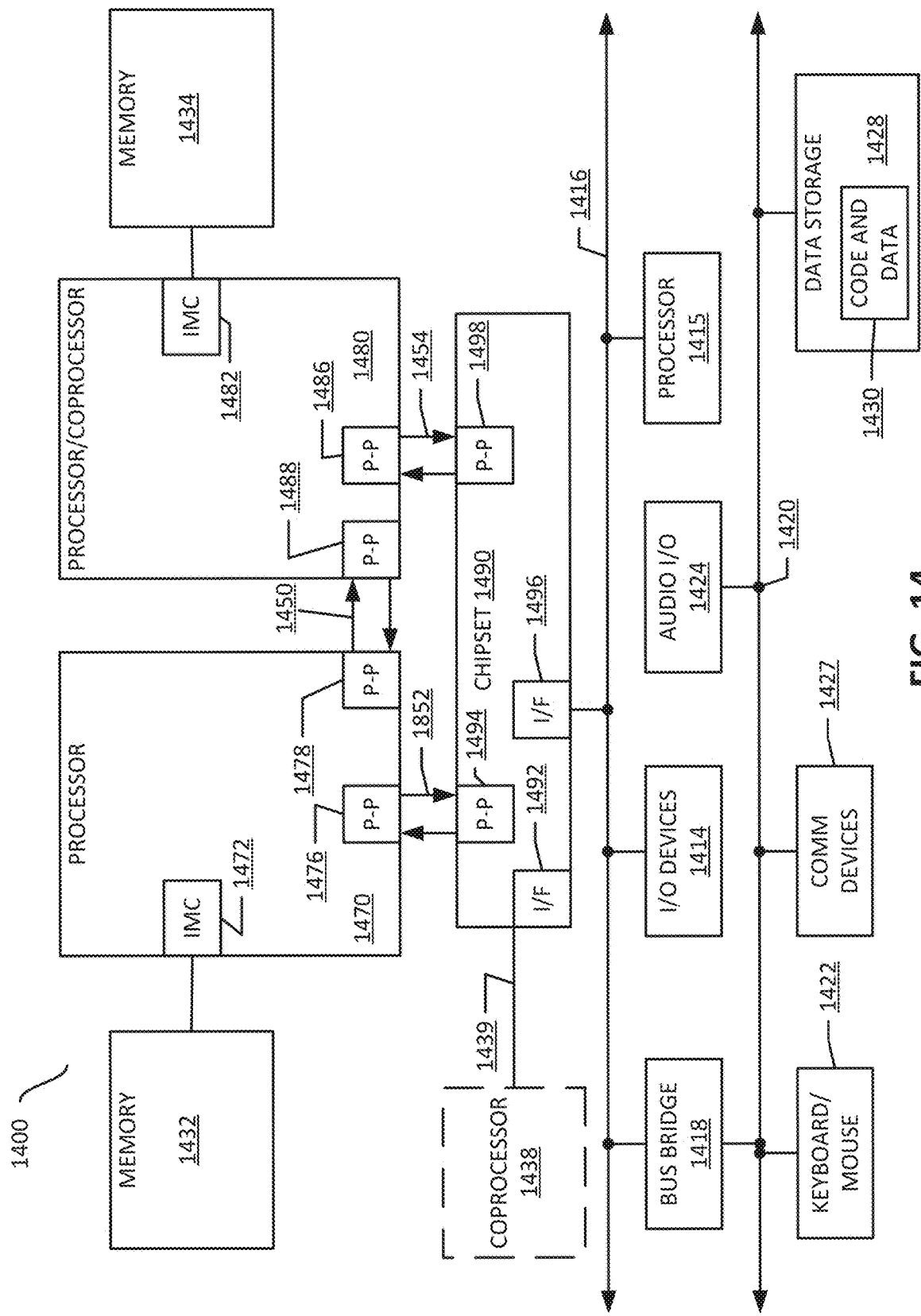

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
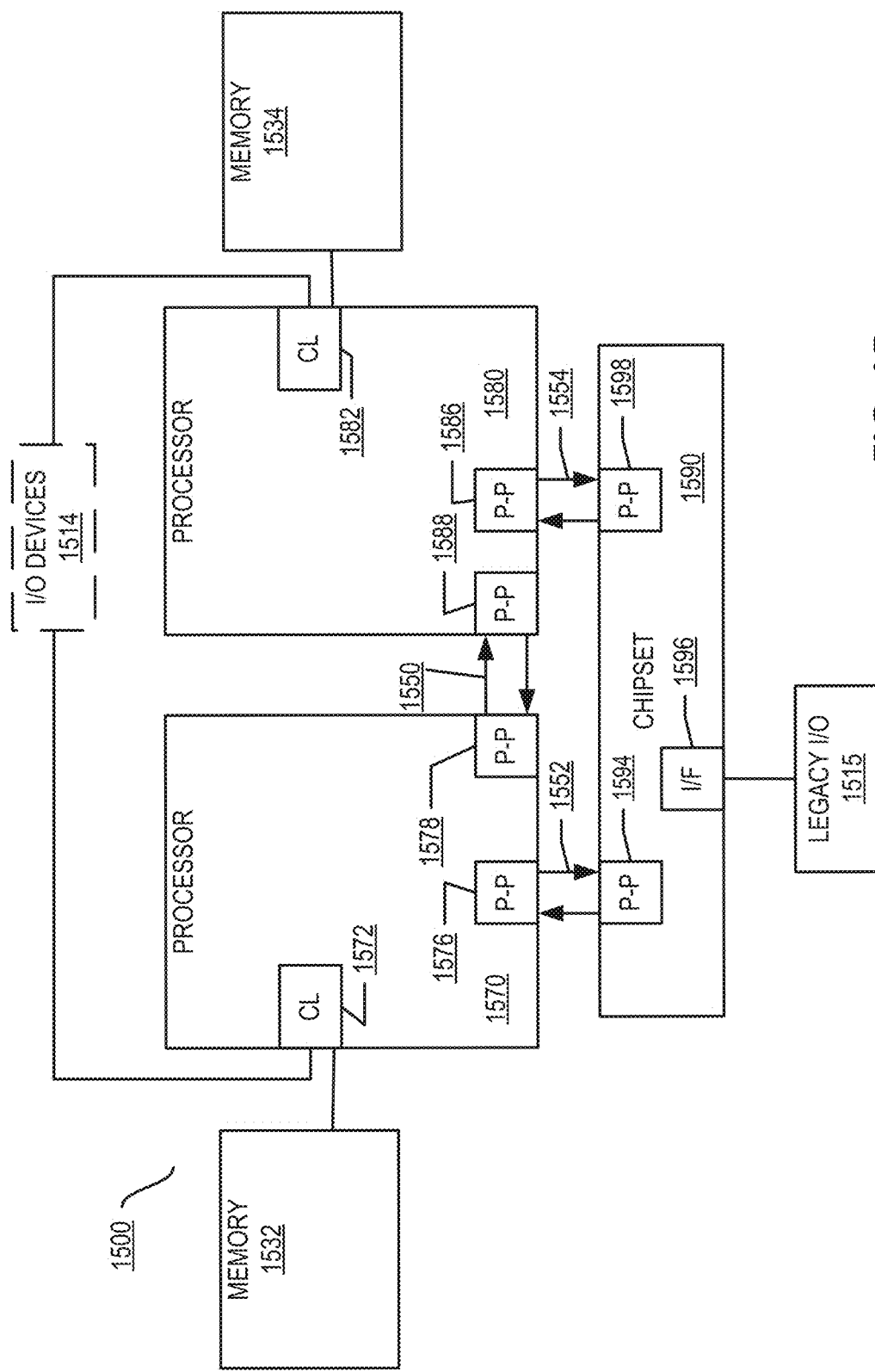

Referring now to FIG. 15, shown is a block diagram of a second more specific exemplary system 1500 in accordance with an embodiment of the present invention. For instance, FIG. 15 illustrates that the processors 1570, 1580 may include integrated memory and I/O control logic ("CL") 1572 and 1582, respectively. Thus, the CL 1572, 1582 include integrated memory controller units and include I/O control logic. FIG. 15 illustrates that not only are the memories 1532, 1534 coupled to the CL 1572, 1582, but also that I/O devices 1514 are also coupled to the control logic 1572, 1582. Legacy I/O devices 1515 are coupled to the chipset 1590.

Figure 16:
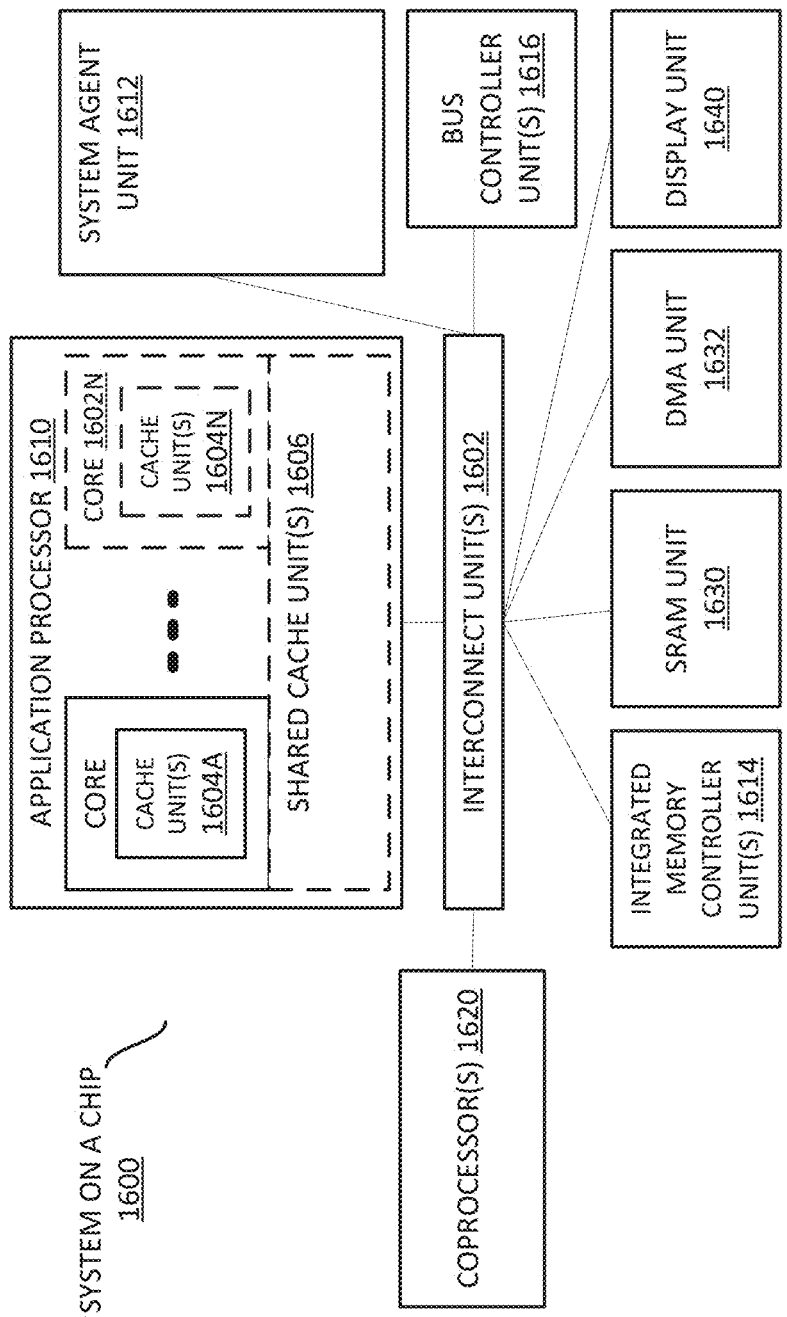

Referring now to FIG. 16, shown is a block diagram of a SoC 1600 in accordance with an embodiment of the present invention. Also, dashed lined boxes are optional features on more advanced SoCs. In FIG. 16, an interconnect unit(s) 1602 is coupled to: an application processor 1610 which includes a set of one or more cores 1620A-N and shared cache unit(s) 1606; a system agent unit 1612; a bus controller unit(s) 1616; an integrated memory controller unit(s) 1614; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is an apparatus including a processor device; memory to implement one or more cyclic buffers; logic, resident on the processor device to cause the processor device to receive an instruction including a pointer identifier and a pointer change value, and the pointer identifier includes a pointer address field encoded with an address of a line of memory corresponding to a location of a pointer of a particular one of the one or more cyclic buffers, one or more cushion bits, and a buffer identifier field encoded with a buffer identifier assigned to the particular cyclic buffer. The logic may further cause the processor device to identify that the instruction is to apply to the particular cyclic buffer based on the buffer identifier, determine that the pointer change value causes a wraparound of the pointer in the particular cyclic buffer, and fix location of the pointer in the particular cyclic buffer based on the wraparound.

Example 2 may include the subject matter of example 1, where the instruction corresponds to a call by a particular software component executed by the processor device, and the logic is further to cause the processor device to assign a buffer identifier to each of the cyclic buffers, receive a request from the particular software component, prior to the call, for the pointer identifier for the particular cyclic buffer, generate the pointer identifier corresponding to the particular cyclic buffer, and return the pointer identifier to the particular software component.

Example 3 may include the subject matter of example 2, where the one or more cyclic buffers include a plurality of cyclic buffers and the logic is to further cause the processor device to determine that the particular cyclic buffer is to be used by the particular software component.

Example 4 may include the subject matter of any one of examples 2-3, where the call is defined according to an application programming interface (API) defined according to the logic of the processor device.

Example 5 may include the subject matter of any one of examples 1-4, where the cushion bits are between the pointer address field and the buffer identifier field to protect encoding of the buffer identifier.

Example 6 may include the subject matter of example 5, where the cushion bits include two bits, one of the two bits has a binary "1" value, and another of the two bits has a binary "0" value.

Example 7 may include the subject matter of any one of examples 1-6, where the pointer identifier further includes a start address of a particular block of memory in which the particular cyclic buffer is located.

Example 8 may include the subject matter of any one of examples 1-7, where the buffer identifier field and the cushion bits include bits of the pointer identifier higher than bits of the pointer identifier including the pointer address field.

Example 9 may include the subject matter of any one of examples 1-8, where determining that the pointer change value causes a wraparound and fixing the location of the pointer are performed by the processor in a single operation.

Example 10 may include the subject matter of any one of examples 1-9, where the instruction corresponds to a load/store request and is to further cause the processor to store data in the particular cyclic buffer corresponding to the location of the pointer.

Example 11 may include the subject matter of any one of examples 1-10, where the logic includes a microarchitecture of the processor device, and the instruction is defined in an instruction set architecture (ISA) of the processor device corresponding to the microarchitecture.

Example 12 may include the subject matter of any one of examples 1-11, where the instructions is executable by the processor device to further cause the processor device to determine boundaries of the particular cyclic buffer in the memory, determine a current location of the pointer in the memory, calculate a new location of the pointer within memory based on the pointer change value, and determine whether the new location falls outside the boundaries of the particular cyclic buffer, where determining that the new location falls outside the boundaries includes determination of a wraparound of the pointer, and fixing the location of the pointer includes calculating a fixed location of the new location to cause the new location to be within the boundaries of the particular cyclic buffer when the new location is determined to be outside the boundaries.

Example 13 may include the subject matter of any one of examples 1-12, where the logic includes firmware of the processor device.

Example 14 may include the subject matter of example 13, where the one or more cyclic buffers include a plurality of cyclic buffers, the particular software component is one of a plurality of software components in a system, and the firmware is to manage use of the plurality of cyclic buffers by the plurality of software components.

Example 15 may include the subject matter of any one of examples 13-14, where the logic further includes microarchitecture logic of the processor device to support an instruction set architecture (ISA) including a set of instructions including the instruction, and the firmware translates a call from software components executed on the processor into the instruction to cause the processor device to fix location of the pointer in the particular cyclic buffer based on the wraparound.

Example 16 is a machine accessible storage medium having instructions stored thereon, the instructions when executed on a processor device, cause the processor device to: receive a call from a particular software component, where the call includes a pointer identifier and a pointer change value, and the pointer identifier includes a pointer address field encoded with an address of a line of memory corresponding to a location of a pointer in a particular cyclic buffer, one or more cushion bits, and a buffer identifier field encoded with a buffer identifier associated with the particular cyclic buffer; and translate the call to a particular instructions defined in an instruction set of the processor device. The particular instruction includes the pointer identifier as a parameter and the particular instruction is to cause the processor device to perform one or more operations including: identifying the particular cyclic buffer based on the buffer identifier, determining that the pointer change value causes a wraparound of the pointer in the particular cyclic buffer, and fixing location of the pointer in the particular cyclic buffer based on the wraparound.

Example 17 may include the subject matter of example 16, where the particular instruction corresponds to a call by a particular software component executed by the processor device, and the particular instruction is further to cause the processor device to assign a buffer identifier to each of the cyclic buffers, receive a request from the particular software component, prior to the call, for the pointer identifier for the particular cyclic buffer, generate the pointer identifier corresponding to the particular cyclic buffer, and return the pointer identifier to the particular software component.

Example 18 may include the subject matter of example 17, where the one or more cyclic buffers include a plurality of cyclic buffers and the logic is to further cause the processor device to determine that the particular cyclic buffer is to be used by the particular software component.

Example 19 may include the subject matter of any one of examples 17-18, where the call is defined according to an application programming interface (API) defined according to the logic of the processor device.

Example 20 may include the subject matter of any one of examples 16-19, where the cushion bits are between the pointer address field and the buffer identifier field to protect encoding of the buffer identifier.

Example 21 may include the subject matter of example 20, where the cushion bits include two bits, one of the two bits has a binary "1" value, and another of the two bits has a binary "0" value.

Example 22 may include the subject matter of any one of examples 16-21, where the pointer identifier further includes a start address of a particular block of memory in which the particular cyclic buffer is located.

Example 23 may include the subject matter of any one of examples 16-22, where the buffer identifier field and the cushion bits include bits of the pointer identifier higher than bits of the pointer identifier including the pointer address field.

Example 24 may include the subject matter of any one of examples 16-23, where determining that the pointer change value causes a wraparound and fixing the location of the pointer are performed by the processor in a single operation.

Example 25 may include the subject matter of any one of examples 16-24, where the particular instruction corresponds to a load/store request and is to further cause the processor to store data in the particular cyclic buffer corresponding to the location of the pointer.

Example 26 may include the subject matter of any one of examples 16-25, where the particular instruction is according to a microarchitecture of the processor device, and the particular instruction is defined in an instruction set architecture (ISA) of the processor device corresponding to the microarchitecture.

Example 27 may include the subject matter of any one of examples 16-26, where the instructions is to further cause the processor device to: determine boundaries of the particular cyclic buffer in the memory, determine a current location of the pointer in the memory, calculate a new location of the pointer within memory based on the pointer change value; and determine whether the new location falls outside the boundaries of the particular cyclic buffer, where determining that the new location falls outside the boundaries includes determination of a wraparound of the pointer, where fixing the location of the pointer includes calculating a fixed location of the new location to cause the new location to be within the boundaries of the particular cyclic buffer when the new location is determined to be outside the boundaries.

Example 28 may include the subject matter of any one of examples 16-27, where the logic includes firmware of the processor device.

Example 29 may include the subject matter of example 28, where the one or more cyclic buffers include a plurality of cyclic buffers, the particular software component is one of a plurality of software components in a system, and the firmware is to manage use of the plurality of cyclic buffers by the plurality of software components.

Example 30 is a system including a processor core to support a particular instruction set, a memory to implement one or more cyclic buffers, and an operating system. The operating system may be executed by the processor core to manage use of the one or more cyclic buffers by one or more software components; receive a call from a particular one of the one or more software components, where the call includes a pointer identifier and a pointer change value, and the pointer identifier includes a pointer address field encoded with an address corresponding to a location of a pointer in the particular cyclic buffer, one or more cushion bits, and a buffer identifier field encoded with a buffer identifier assigned to a particular one of the one or more cyclic buffers; and translate the call to one or more instructions defined in the particular instruction set of the processor device, where the one or more instructions include the pointer identifier as a parameter and the one or more instructions cause the processor device to: identify the particular cyclic buffer based on the buffer identifier, determine that the pointer change value causes a wraparound of the pointer in the particular cyclic buffer, and fix location of the pointer in the particular cyclic buffer based on the wraparound.

Example 31 may include the subject matter of example 30, where the processor core includes a digital signal processor.

Example 32 may include the subject matter of example 31, including a system on chip (SOC), where the system on chip includes the digital signal processor and a host processor.

Example 33 may include the subject matter of any one of examples 30-32, further including the one or more software components, where the one or more software components include a plurality of kernels compiled from a graph, and the one or more kernels are associated with one or more of the cyclic buffers.

Example 34 may include the subject matter of example 33, where the particular software component includes a particular kernel and includes code to implement the call, where the code is according to an application programming interface corresponding to the instruction set.

Example 35 may include the subject matter of any one of examples 30-36, where the operating system includes firmware of the processor core.

Example 36 may include the subject matter of any one of examples 30-36, where the call includes a pointer update call to update the location of the pointer.

Example 37 may include the subject matter of example 36, where the call includes a load data call to load data in the particular cyclic buffer.

Example 38 may include the subject matter of example 36, where the call includes a load/store call to load data from a register and store the data in the particular cyclic buffer.

Example 39 may include the subject matter of example 36, where the call corresponds to a gather scatter operation.

Example 40 is a method including: receiving a call from a particular software component, where the call includes a pointer identifier and a pointer change value, and the pointer identifier includes a pointer address field encoded with an address of a line of memory corresponding to a location of a pointer in a particular cyclic buffer, one or more cushion bits, and a buffer identifier field encoded with a buffer identifier associated with the particular cyclic buffer; and translating the call to an instructions defined in an instruction set of the processor device. The instruction includes the pointer identifier as a parameter and the instruction is to cause the processor device to: identify the particular cyclic buffer based on the buffer identifier; determine that the pointer change value causes a wraparound of the pointer in the particular cyclic buffer; and fix location of the pointer in the particular cyclic buffer based on the wraparound.

Example 41 may include the subject matter of example 40, where the instruction is to further cause the processor device to: assign a buffer identifier to each of the cyclic buffers; receive a request from the particular software component, prior to the call, for the pointer identifier for the particular cyclic buffer; generate the pointer identifier corresponding to the particular cyclic buffer; and return the pointer identifier to the particular software component.

Example 42 may include the subject matter of example 41, where the one or more cyclic buffers include a plurality of cyclic buffers and the logic is to further cause the processor device to determine that the particular cyclic buffer is to be used by the particular software component.

Example 43 may include the subject matter of any one of examples 41-42, where the call is defined according to an application programming interface (API) defined according to the logic of the processor device.

Example 44 may include the subject matter of any one of examples 40-43, where the cushion bits are between the pointer address field and the buffer identifier field to protect encoding of the buffer identifier.

Example 45 may include the subject matter of example 44, where the cushion bits include two bits, one of the two bits has a binary "1" value, and another of the two bits has a binary "0" value.

Example 46 may include the subject matter of any one of examples 40-45, where the pointer identifier further includes a start address of a particular block of memory in which the particular cyclic buffer is located.

Example 47 may include the subject matter of any one of examples 40-46, where the buffer identifier field and the cushion bits include bits of the pointer identifier higher than bits of the pointer identifier including the pointer address field.

Example 48 may include the subject matter of any one of examples 40-47, where determining that the pointer change value causes a wraparound and fixing the location of the pointer are performed by the processor in a single operation.

Example 49 may include the subject matter of any one of examples 40-48, where the instruction corresponds to a load/store request and is to further cause the processor to store data in the particular cyclic buffer corresponding to the location of the pointer.

Example 50 may include the subject matter of any one of examples 40-49, where the instruction is in accordance with a microarchitecture of the processor device, and the instruction is defined in an instruction set architecture (ISA) of the processor device corresponding to the microarchitecture.

Example 51 may include the subject matter of any one of examples 40-50, where the instruction is executable by the processor device to cause the processor device to: determine boundaries of the particular cyclic buffer in the memory; determine a current location of the pointer in the memory; calculate a new location of the pointer within memory based on the pointer change value; and determine whether the new location falls outside the boundaries of the particular cyclic buffer, where determining that the new location falls outside the boundaries includes determination of a wraparound of the pointer; where fixing the location of the pointer includes calculating a fixed location of the new location to cause the new location to be within the boundaries of the particular cyclic buffer when the new location is determined to be outside the boundaries.

Example 52 may include the subject matter of any one of examples 40-51, where the call is received by firmware of the processor device.

Example 53 may include the subject matter of example 52, where the one or more cyclic buffers include a plurality of cyclic buffers, the particular software component is one of a plurality of software components in a system, and the firmware is to manage use of the plurality of cyclic buffers by the plurality of software components.

Example 54 is a system including means to perform the method of any one of examples 40-53.

Example 55 is an apparatus including a processor device including a decoder to decode an instruction including a pointer identifier and a pointer change value, where the pointer identifier includes a pointer address field encoded with an address corresponding to a location of a pointer of a particular cyclic buffer, one or more cushion bits, and a buffer identifier field encoded with a buffer identifier assigned to the particular cyclic buffer. The processor may further include one or more execution units to execute the decoded instruction to cause the processor device to: identify the particular cyclic buffer based on the buffer identifier; determine that the pointer change value causes a wraparound of the pointer in the particular cyclic buffer; and fix the location of the pointer in the particular cyclic buffer based on the wraparound.

Example 56 may include the subject matter of example 55, further including a memory to implement one or more cyclic buffers, where the one or more cyclic buffers include the particular cyclic buffer.

Example 57 may include the subject matter of any one of examples 55-56, where the cushion bits are between the pointer address field and the buffer identifier field to protect encoding of the buffer identifier.

Example 58 may include the subject matter of example 57, where the cushion bits include two bits, one of the two bits has a binary "1" value, and another of the two bits has a binary "0" value.

Example 59 may include the subject matter of any one of examples 55-58, where the pointer identifier further includes a start address of a particular block of memory in which the particular cyclic buffer is located.

Example 60 may include the subject matter of any one of examples 55-59, where the buffer identifier field and the cushion bits include bits of the pointer identifier higher than bits of the pointer identifier including the pointer address field.

Example 61 may include the subject matter of any one of examples 55-60, where determining that the pointer change value causes a wraparound and fixing the location of the pointer are to be performed by the processor in a single operation.

Example 62 may include the subject matter of any one of examples 55-61, where the instruction corresponds to a load/store request and is to further cause the processor to store data in the particular cyclic buffer corresponding to the location of the pointer.

Example 63 may include the subject matter of any one of examples 55-62, where determining that the pointer change value causes a wraparound includes: determine boundaries of the particular cyclic buffer in the memory; determine a current location of the pointer in the memory; calculate a new location of the pointer within memory based on the pointer change value; and determine whether the new location falls outside the boundaries of the particular cyclic buffer, where determining that the new location falls outside the boundaries includes determination of a wraparound of the pointer.

Example 64 may include the subject matter of example 63, where fixing the location of the pointer includes calculating a fixed location of the new location to cause the new location to be within the boundaries of the particular cyclic buffer when the new location is determined to be outside the boundaries.

Example 65 may include the subject matter of any one of examples 55-64, where the processor device further includes firmware to manage use of the particular cyclic buffer by one or more software applications.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:
   a processor device comprising:
      a decoder to decode an instruction comprising a pointer identifier and a pointer change value, wherein the pointer identifier comprises a pointer address field encoded with an address corresponding to a location of a pointer of a particular cyclic buffer, one or more cushion bits, and a buffer identifier field encoded with a buffer identifier assigned to the particular cyclic buffer; and
      one or more execution units to execute the decoded instruction to cause the processor device to:
         identify the particular cyclic buffer based on the buffer identifier;
         determine that the pointer change value causes a wraparound of the pointer in the particular cyclic buffer; and
         set the location of the pointer in the particular cyclic buffer based on the wraparound.

2. The apparatus of claim 1, further comprising a memory to implement one or more cyclic buffers, wherein the one or more cyclic buffers include the particular cyclic buffer.

3. The apparatus of claim 1, wherein the cushion bits are between the pointer address field and the buffer identifier field to protect encoding of the buffer identifier.

4. The apparatus of claim 3, wherein the cushion bits comprise two bits, one of the two bits has a binary "1" value, and another of the two bits has a binary "0" value.

5. The apparatus of claim 1, wherein the pointer identifier further comprises a start address of a particular block of memory in which the particular cyclic buffer is located.

6. The apparatus of claim 1, wherein the buffer identifier field and the cushion bits comprise bits of the pointer identifier higher than bits of the pointer identifier comprising the pointer address field.

7. The apparatus of claim 1, wherein determining that the pointer change value causes a wraparound and setting the location of the pointer are to be performed by the processor in a single operation.

8. The apparatus of claim 1, wherein the instruction corresponds to a load/store request and is to further cause the processor to store data in the particular cyclic buffer corresponding to the location of the pointer.

9. The apparatus of claim 1, wherein determining that the pointer change value causes a wraparound comprises:
   determining boundaries of the particular cyclic buffer in the memory;
   determining a current location of the pointer in the memory;
   calculating a new location of the pointer within memory based on the pointer change value; and
   determining whether the new location falls outside the boundaries of the particular cyclic buffer, wherein determining that the new location falls outside the boundaries comprises determination of a wraparound of the pointer.

10. The apparatus of claim 9, wherein setting the location of the pointer comprises calculating a modified location of the new location to cause the new location to be within the boundaries of the particular cyclic buffer when the new location is determined to be outside the boundaries.

11. The apparatus of claim 1, wherein the processor device further comprises firmware to manage use of the particular cyclic buffer by one or more software applications.

12. At least one non-transitory machine accessible storage medium having instructions stored thereon, the instructions when executed on a processor device, cause the processor device to:
   receive a call from a particular software component, wherein the call comprises a pointer identifier and a pointer change value, and the pointer identifier comprises a pointer address field encoded with an address of a line of memory corresponding to a location of a pointer in a particular cyclic buffer, one or more cushion bits, and a buffer identifier field encoded with a buffer identifier associated with the particular cyclic buffer; and
   translate the call to an instruction defined in an instruction set of the processor device, wherein the instruction comprises the pointer identifier as a parameter and the instruction is to cause the processor device to perform one or more operations comprising:
      identifying the particular cyclic buffer based on the buffer identifier;
      determining that the pointer change value causes a wraparound of the pointer in the particular cyclic buffer; and
      setting location of the pointer in the particular cyclic buffer based on the wraparound.

13. The storage medium of claim 12, wherein the call comprises a second call and the instructions, when executed further cause the processor device to:
   assign a buffer identifier to the particular cyclic buffer;
   receive a first call from the particular software component, prior to the second call, for the pointer identifier for the particular cyclic buffer;
   generate the pointer identifier corresponding to the particular cyclic buffer; and
   return the pointer identifier to the particular software component.

14. The storage medium of claim 12, wherein the particular cyclic buffer is one of a plurality of cyclic buffers, and the instructions, when executed further cause the processor device to determine that the particular cyclic buffer is to be used by the particular software component.

15. The storage medium of claim 14, wherein the particular software component is one of a plurality of software components in a system, and the instructions, when executed further cause the processor device to manage use of the plurality of cyclic buffers by the plurality of software components.

16. The storage medium of claim 12, wherein the call is defined according to an application programming interface (API) corresponding to an instruction set architecture (ISA) of the processor device.

17. A system comprising:
   a processor core to support a particular instruction set;
   a memory to implement one or more cyclic buffers; and
   an operating system, executed by the processor core to:
      manage use of the one or more cyclic buffers by one or more software components;
      receive a call from a particular one of the one or more software components, wherein the call comprises a pointer identifier and a pointer change value, and the pointer identifier comprises a pointer address field encoded with an address corresponding to a location of a pointer in the particular cyclic buffer, one or more cushion bits, and a buffer identifier field encoded with a buffer identifier assigned to a particular one of the one or more cyclic buffers;
      translate the call to one or more instructions defined in the particular instruction set of the processor device, wherein the one or more instructions comprise the pointer identifier as a parameter and the one or more instructions are executable by the processor device to cause the processor device to:
         identify the particular cyclic buffer based on the buffer identifier;
         determine that the pointer change value causes a wraparound of the pointer in the particular cyclic buffer; and
         set the location of the pointer in the particular cyclic buffer based on the wraparound.

18. The system of claim 17, wherein the processor core comprises a digital signal processor and the system further comprises a host processor.

19. The system of claim 17, further comprising the one or more software components, wherein the one or more software components comprise a plurality of kernels compiled from a graph, and the one or more kernels are associated with one or more of the cyclic buffers.

20. The system of claim 17, wherein the operating system comprises firmware of the processor core.

* * * * *